(12) United States Patent
Kuder et al.

(10) Patent No.: US 11,736,045 B2
(45) Date of Patent: Aug. 22, 2023

(54) SYSTEM AND METHOD FOR SUPPLYING AC DRIVING VOLTAGES TO A PLURALITY OF ELECTRIC MOTORS BY USING A MODULAR ENERGY STORAGE DIRECT CONVERTER SYSTEM

(71) Applicant: Universitaet der Bundeswehr Muenchen, Neubiberg (DE)

(72) Inventors: Manuel Kuder, Munich (DE); Thomas Weyh, Munich (DE); Richard Eckerle, Munich (DE)

(73) Assignee: Universität der Bundeswehr München, Neubiberg (DE)

( * ) Notice: Subject to any disclaimer, the term of this patent is extended or adjusted under 35 U.S.C. 154(b) by 0 days.

(21) Appl. No.: 17/604,551

(22) PCT Filed: Apr. 21, 2020

(86) PCT No.: PCT/EP2020/061087
§ 371 (c)(1),
(2) Date: Oct. 18, 2021

(87) PCT Pub. No.: WO2020/224951
PCT Pub. Date: Nov. 12, 2020

(65) Prior Publication Data
US 2022/0200492 A1    Jun. 23, 2022

(30) Foreign Application Priority Data
May 6, 2019    (EP) ..................................... 19172834

(51) Int. Cl.
*H02P 27/08*    (2006.01)
*H02P 5/74*    (2006.01)
(Continued)

(52) U.S. Cl.
CPC ............ *H02P 5/74* (2013.01); *H02M 1/0043* (2021.05); *H02M 7/5395* (2013.01); *H02P 27/08* (2013.01); *B60L 50/51* (2019.02)

(58) Field of Classification Search
CPC ........ H02P 5/74; H02P 27/08; H02M 1/0043; H02M 7/5395; B60L 50/51
See application file for complete search history.

(56) References Cited

U.S. PATENT DOCUMENTS 4,088,934 A  *  5/1978  D'Atre .................. B60L 15/025
                                              318/808
5,917,295 A     6/1999  Mongeau
(Continued)

FOREIGN PATENT DOCUMENTS

DE    102011004248 A1    8/2011
DE    102013203734 A1    9/2014
(Continued)

OTHER PUBLICATIONS

Michail VVasiladiotis & Alfred Rufer, A Modular Multiport Power Electronic Transformer With Integrated Split Battery Energy Storage for Versatile Ultrafast EV Charging Stations, IEEE Transaction on Industrial Electronics, May 5, 2015, pp. 3213-3222, vol. 62, No. 5, IEEE, Munchen DE.
(Continued)

*Primary Examiner* — Rina I Duda
(74) *Attorney, Agent, or Firm* — Grossman, Tucker, Perreault & Pfleger PLLC; Steven J. Grossman

(57) ABSTRACT

A system for supplying AC driving voltages to a plurality of electric motors, wherein said plurality of electric motors comprise a main electric motor, one or more additional electric motors, and a variable voltage source associated with each phase of said main motor, wherein with each phase of each of said one or more additional electric motors a plurality of switches is associated, which are controllable
(Continued)

for selectively acquiring a neutral switching state and at least one of a positive parallel switching state, and a positive serial switching state. The plurality of switches associated with a given phase of a given additional electric motor are switched to apply an effective voltage to said given phase corresponding to a set value of the corresponding phase voltage, and said variable voltage sources are controlled to provide a voltage corresponding to a voltage ensuring that an effective voltage corresponding the set value of the corresponding phase voltage of the main electric motor is applied to each of its phases, in consideration of the effective voltages applied to the phases of the additional electric motors by switching said plurality of switches associated with these phases.

27 Claims, 13 Drawing Sheets

(51) Int. Cl.
  *H02M 1/00* (2006.01)
  *H02M 7/5395* (2006.01)
  *B60L 50/51* (2019.01)

(56) References Cited

U.S. PATENT DOCUMENTS

| | | | |
|---|---|---|---|
| 6,058,032 A | 5/2000 | Yamanaka et al. | |
| 6,954,366 B2 * | 10/2005 | Lai | H02M 5/293 363/71 |
| 8,988,016 B2 * | 3/2015 | Daigle | B60L 3/104 318/434 |
| 10,637,251 B2 * | 4/2020 | Helling | H02J 3/38 |
| 2011/0198936 A1 | 8/2011 | Graovac et al. | |
| 2015/0270801 A1 * | 9/2015 | Kessler | H02J 7/0024 318/139 |
| 2019/0115849 A1 | 4/2019 | Götz | |
| 2020/0014310 A1 | 1/2020 | Helling et al. | |

FOREIGN PATENT DOCUMENTS

| | | |
|---|---|---|
| DE | 102016125720 A1 | 6/2018 |
| EP | 2477326 A1 | 7/2012 |

OTHER PUBLICATIONS

Azeddine Draou, A Simplified Sliding Mode Controlled Electronic Differential for an Electric Vehicle with Two Independent Wheel Drives, Energy and Power Engineering, 2013, pp. 416-421, vol. 5, Scientific Research.
A. Lesnicar & R. Marquardt, An innovative Modular Multilevel Converter Topology Suitable for a Wide Power Range, Presented at 2003 IEEE Bologna PowerTech Conference, Jun. 23, 2003, Bologna Italy.
Noriko Kawakami et al, Development of a 500-kW Modular Multilevel Cascade Converter for Battery Energy Storage Systems, IEEE Transaction on Industry Applications, Nov./Dec. 2014, pp. 3902-3910, vol. 50, No. 6, IEEE, Munchen DE.
Fengqi Chang et al, Improving the Overall Efficiency of Automotive Inverters Using a Multilevel Converter Composed of Low Voltage Si MOSFETs, 2018, Manuscript ID TPEL-Reg-2018-01-0186.R1.
International Search Report and Written Opinion of International Application PCT/EP2020/061087, dated May 28, 2020, 14 pages.
Helling Florian et al, Modular Multilevel Parallel Converter (M2PC) for Electrically Driven Vehicles, PCIM Europe 2014, May 20-22, 2014, Nuremberg Germany, ISBN 978-3-8007-3603-4.
Proceedings of the FISITA 2012 World Automotive Congress vol. 8: Vehicle Design and Testing (II), Society of Automotive Engineers of China (SAE—China) International Federation of Automotive Engineering Societies (FISITA), vol. 196, DOI 10.1007/978-3-642-33738-3, Springer Heidelberg New York Dordrecht London.

* cited by examiner

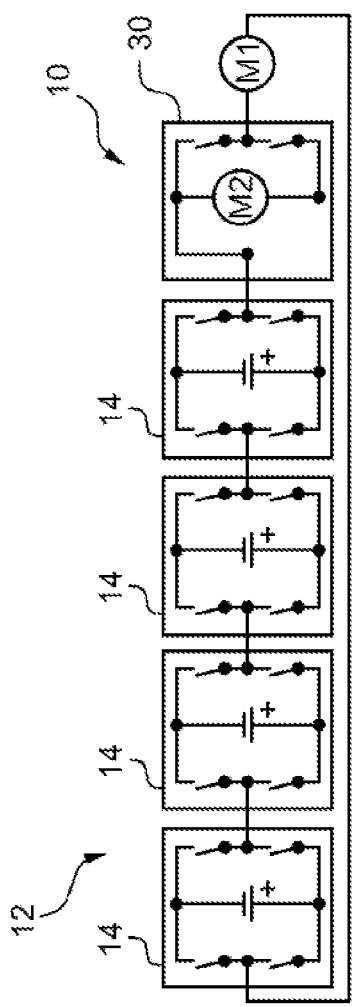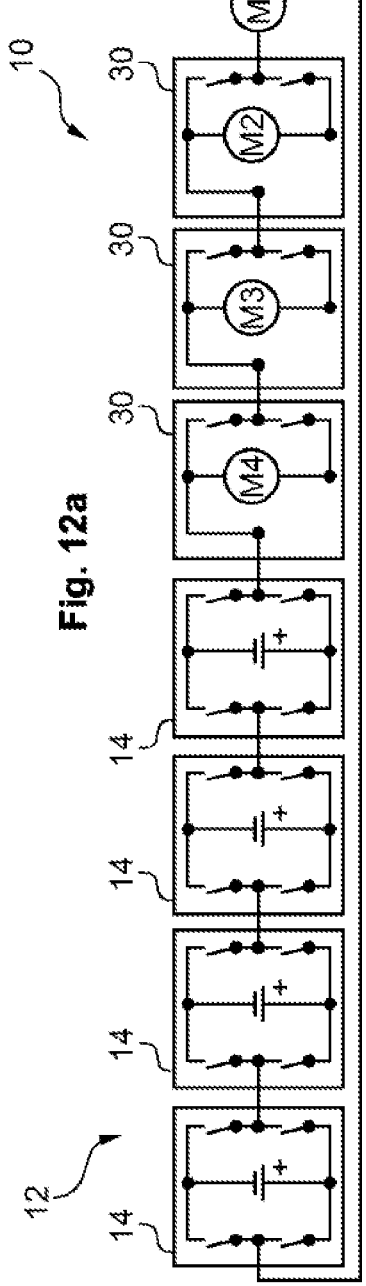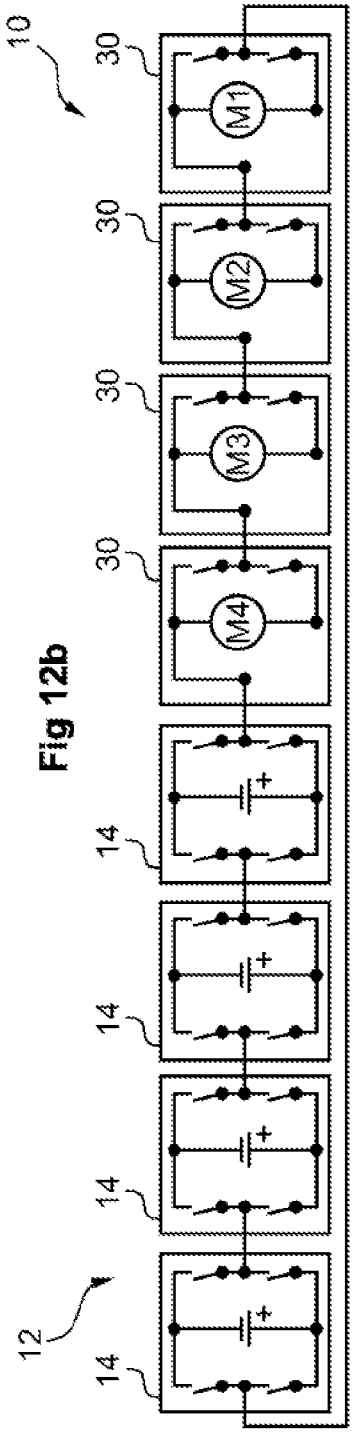
Fig. 12a
Fig. 12b
Fig. 12c

SYSTEM AND METHOD FOR SUPPLYING AC DRIVING VOLTAGES TO A PLURALITY OF ELECTRIC MOTORS BY USING A MODULAR ENERGY STORAGE DIRECT CONVERTER SYSTEM

RELATED APPLICATIONS

This application is a National Phase Application filed under 35 USC § 371 of PCT Application No. PCT/EP2020/061087 with an international filing date of Apr. 21, 2020, which claims priority of European Patent Application No. EP19172834.4 filed May 6, 2019. Each of these applications is herein incorporated by reference in its entirety for all purposes.

FIELD OF THE INVENTION

The present invention is in the field of power supplies for electric motors, in particular for use in electric vehicles. More particularly, the present invention relates to a system and a method for supplying AC driving voltages to a plurality of electric motors.

BACKGROUND OF THE INVENTION

In high-performance electric vehicles, there is a trend to install an auxiliary drive machine in addition to the main drive machine on the front or rear axle. This makes it possible to transfer a desired torque to the road without spinning tires. The ultimate aim for electric vehicle manufacturers is to equip each wheel with its own electric motor. This would allow so-called torque vectoring, which can be used to increase dynamics and improve the drivability of the vehicle, as is e.g. described in Y. Li and J. Liu, "*Voltage vector selection strategy of permanent magnet synchronous motor direct torque control system,*" in Proceedings of the 32nd Chinese Control Conference, 2013, pp. 4414-4419.

In state of the art electric vehicles, the powertrain consists of a central high-voltage direct current bus (DC-bus), a battery storage system and several converters which feed into or from the DC-bus, as is illustrated in FIG. 15. The battery storage system is built by secondary cells connected in series to increase the system voltage. To boost the overall system capacity and performance, additional secondary cells can be installed in parallel. Due to the static interconnection of the secondary cells and the variances of the electrical properties of the secondary cells, battery management systems (BMS) are needed for balancing the state of charge (SOC) in order to increase the usable capacity and for safety reasons. Such static systems, when used in combination with PWM-converters, suffer from serious drawbacks, such as a poor partial load efficiency and high total harmonic distortion (THD), as reported in A. Kersten, E. Grunditz, and T. Thiringer, "*Efficiency of active three-level and five-level npc inverters compared to a two-level inverter in a vehicle,*" in 2018 20th European Conference on Power Electronics and Applications (EPE'18 ECCE Europe), 2018, P.1P.9. Such static systems further suffer from the need for high voltage switches and poor fault tolerance (see F. Helling, M. Pfaeffl, J. Huber, S. Goetz, and T. Weyh, "*Modular multilevel parallel converter (m2pc) for electrically driven vehicles,*" in PCIM Europe 2014; International Exhibition and Conference for Power Electronics, Intelligent Motion, Renewable Energy and Energy Management, 2014, pp. 1-8.). Moreover, additional converters are needed for the implementation of every additional feature, like high-voltage direct current fast charging or inductive charging.

To meet these challenges, modular energy storage direct converter systems have been proposed as voltage sources for electric vehicles in DE 10 2017 110 410, WO2016/012247 A1, and WO2018/122094 A1. Such Modular energy storage direct converter systems employ a similar topology as that known from modular multilevel converters (MMC) as e.g. described in A. Lesnicar and R. Marquardt, "*An innovative modular multilevel converter topology suitable for a wide power range,*" in 2003 IEEE Bologna Power Tech Conference Proceedings, vol. 3, 2003, 6 pp. Vol.3-. DOI: 10.1109/PTC.2003.1304403, except that the capacitors commonly used in multilevel converters are replaced by batteries or secondary cells. Such modular energy storage direct converter systems are also referred to as split-battery energy storage systems (sBESS) and have been further discussed in N. Kawakami, S. Ota, H. Kon, S. Konno, H. Akagi, et al., "*Development of a 500-kw modular multilevel cascade converter for battery energy storage systems,*" IEEE Transactions on Industry Applications, vol. 50, no. 6, pp. 3902-3910, 2014. DOI: 10.1109/TIA.2014.2313657 , and in M. Vasiladiotis and A. Rufer, "*A modular multiport power electronic transformer with integrated slit battery energy storage for versatile ultrafast ev charging stations,*" IEEE Transactions on Industrial Electronics, vol. 62, no. 5, pp. 3213-3222, 2015. DOI: 10.1109/TIE.2014.2367237. The modular energy storage direct converter systems or sBESS allow for highly integrated systems combining the power electronics with traction converter, battery charging interface and BMS. This significantly simplifies the powertrain architecture and charging topologies by combining battery storage system and voltage transformer as well as eliminating dedicated converters. Moreover, they have the potential to boost partial load efficiency, as has been shown in F. Chang, O. Ilina, L. Voss, and M. Lienkamp, "*Improving the overall efficiency of automotive inverters using a multilevel converter composed of low voltage si mosfets,*" IEEE Transactions on Power Electronics, pp. 1-1, 2018. DOI: 10.1109/TPEL.2018.2854756. and C. Korte, E. Specht, M. Hiller, and in S. Goetz, "*Efficiency evaluation of mmspc/chb topologies for automotive applications,*" in 2017 IEEE 12th International Conference on Power Electronics and Drive Systems (PEDS), 2017, pp. 324-330. DOI: 10.1109/PEDS.2017.8289145.

Despite their increased component complexity, modular energy storage direct converter systems have proven to be cost competitive as compared to state-of-the-art battery storage systems. However, if a plurality of electric motors are to be supplied with AC driving voltages, in principle, one modular energy storage array converter system needs to be provided for each of the electric motors, which would suggest that the number of modules multiplies by a factor according to the number of electric motors, thereby leading to increased costs. Accordingly, when it comes to supplying a plurality of electric traction motors with electric energy at the same time, as is the case in advanced electric vehicles, the ordinary arrangement as shown in FIG. 15 based on a central high-voltage DC-bus, a battery storage system and several converters which feed into or from the DC-bus is currently believed to be more cost efficient.

SUMMARY OF THE INVENTION

The problem underlying the present invention is to provide a system for supplying AC driving voltages to a plurality of electric motors that allows for overcoming the above drawbacks. This problem is solved by a system according to claim 1 and a method according to claim 9. Favorable embodiments are described in the dependent claims.

According to one aspect, the present invention provides a system for supplying AC driving voltages to a plurality of electric motors, wherein said plurality of electric motors comprise a main electric motor and one or more additional electric motors. The "main" and "additional motors" as referred to herein are mainly distinguished by the way they are controlled, but this terminology shall as such not imply any further limitations. In particular, it is possible that the main electric motor is such is of exactly the same type as the additional electric motor(s).

The system of the invention comprises a control unit for generating or receiving a time-dependent set value of a phase voltage to be applied to each phase of each electric motor of said plurality of electric motors. Herein, the term that a voltage is "applied to each phase" shall generally mean that a voltage is applied across the windings associated with a phase. For example, in electric motors that have only one terminal per phase, this would correspond to the voltage difference between the terminal and the so-called star point, at which the windings of three phases are connected. If the electric motor has two terminals for each phase, the "voltage applied to each phase" is to be understood as the voltage applied across the two terminals.

The system further comprises a variable voltage source associated with each phase of said main motor, wherein each of said variable voltage sources is configured to provide a variable voltage under the control of said control unit.

Each phase of said main electric motor is connected or connectable to a corresponding one of the variable voltage sources. A plurality of switches is associated with each phase of each of said one or more additional electric motors, which switches are controllable by said control unit. Under control of said control unit, said plurality of switches allow for selectively acquiring a neutral switching state, in which the phase of said additional electric motor is not receiving energy from said variable voltage source, and at least one of a positive parallel switching state, in which the phase of the additional electric motor is connected in parallel with the variable voltage source, a positive serial switching state, in which the phase of the additional electric motor is connected in series with the corresponding phase of the main electric motor.

Herein, said control unit is configured to control switching of the plurality of switches associated with a given phase of a given additional electric motor between switching states including said neutral switching state and at least one of said positive parallel and positive serial switching states, to thereby apply an effective voltage to said given phase corresponding to the set value of the corresponding phase voltage. The terms "positive" in "positive parallel/serial switching" per se are not intended to be limiting, but merely define a polarization that is to be distinguished from possible "negative parallel/serial switching" introduced below for preferred but optional embodiments. Note that in the positive serial switching state, the additional electric motors do not receive their phase voltage(s) from the main electric motor, but rather receive a voltage share of the voltage provided by the variable voltage source, which is divided among the main electric motor and each of the one or more additional electric motors which are currently connected in series. Graphically speaking, the phase of the additional electric motor receives the voltage that is "left over" by the voltage applied to the phase of the main electric motor (and possibly by further additional electric motor phases which are likewise connected in series). Note further that in the positive parallel switching state, the phase of the additional electric motor may, but need not be connected in parallel with the phase of the main electric motor. However, in the positive parallel switching state, the phase voltage received by the additional electric motor is preferably independent from the switching states of the main electric motor and further additional electric motors, as is characteristic for a parallel connection. Instead, the phase voltage received by the phase of the additional electric motor is preferably identical with, or at least a constant fraction of the output voltage of the corresponding variable voltage source.

Moreover, the control unit is configured to control each of said variable voltage sources to provide a voltage corresponding to or at least close to a voltage ensuring that an effective voltage corresponding the set value of the corresponding phase voltage of the main electric motor is applied to each of its phases, in consideration of the effective voltages applied to the phases of the additional electric motors by switching said plurality of switches associated with these phases.

According to this aspect of the invention, one variable voltage source is needed for each phase of the main motor only, while no further variable voltage sources are needed for the phases of the additional electric motors. This greatly reduces the costs for the system. In particular, in such systems, it becomes affordable to use energy storage direct converter systems (sBESS or the like) as the variable voltage sources, because no additional sBESS have to be provided for each additional electric motor. This greatly reduces the costs and complexity of the system. As will be shown below, by the combination of a suitable control of the switching states (neutral switching states and at least one of positive parallel and positive serial switching states) associated with the additional electric motors on the one hand and the control of the variable voltage source on the other hand, it can be ensured that to each phase of each electric motor, an effective voltage corresponding or at least close to the set value of the corresponding phase voltage is applied. The term "effective voltage" accounts for the fact that due to the switching between discrete switching states, the true voltage is alternating between discrete levels as well, but at a frequency that is so high that the time average of the switching voltage is effectively applied, in view of the inherent low-pass filtering associated with the electric motor, in a manner known from PWM techniques or the like, and this time average refers to the "effective voltage" is referred to herein.

Note that in some embodiments, the variable voltage source is only capable of providing voltages at discrete levels. This can be the case if modular energy storage direct converter systems such as sBESS are used for the variable voltage source, where in principle, the output voltage is discretized according to the voltage of the individual batteries. In this case, a continuous effective voltage may still be provided by the energy storage direct converter system e.g. by switching one of the battery modules at a higher frequency according to a PWM technique to thereby smoothen out the stepped output voltage. However, this may not be necessary, and in some embodiments, it is simply accepted that only a stepped variable voltage is outputted by the variable voltage source. Accordingly, it is not necessary that the variable voltage sources are controlled to provide a voltage corresponding precisely to a voltage ensuring that an effective voltage corresponding to the set voltage of the corresponding phase voltage of the main electric motor is applied to each of its phases, but it can be sufficient that the voltage provided "close to" such voltage at any given point in time.

Herein, "close to" could e.g. mean that it deviates, at any point in time, by less than 25%, preferably less than 10% and most preferably less than 5% from the aforementioned voltage.

In a preferred embodiment, the plurality of switches associated with each phase of each of said additional electric motors further allow for acquiring, under the control of the control unit, at least one of
- a negative parallel switching state, in which the phase of the additional electric motor is connected anti-parallel with the variable voltage source, and
- a negative serial switching state, in which the phase of the additional electric motor is connected in anti-series with the corresponding phase of the main electric motor.

This way, the voltage amplitude available for the phases of the additional electric motors is effectively doubled, as will become more apparent from the description of specific embodiments below.

In a particularly favorable embodiment, referred to as "first embodiment" in the following, the control unit is configured to control said plurality of switches associated with a given phase of a given additional electric motor to selectively establish a switching state selected from said neutral switching state, said positive parallel switching state and preferably also said negative parallel switching state, to thereby apply an effective voltage to said given phase corresponding to the set value of the corresponding phase voltage, and wherein said control unit is configured to control each of said variable voltage sources to provide a voltage corresponding to or at least close to the set value of the corresponding phase voltage of the main electric motor plus a common offset voltage that is common to each of said variable voltage sources.

This embodiment is particularly useful for applications in vehicles where four electric motors, i.e. one main electric motor and three additional electric motors are provided, each of them associated with a corresponding wheel of the vehicle. Under normal driving conditions, the desired rotation speed of the electric motors will be the same or very similar, meaning that the set values of the phase voltages to be applied to corresponding phases of each of the main and additional electric motors will be identical or at least very similar. Note in this regard, that in typical applications, the applied voltage is related to the rotary speed and the applied current is related to the torque produced by the electric motor. Under such driving conditions, the switches associated with each phase of each of the additional electric motors can therefore simply be kept in the positive parallel state, such that the same voltages applied to corresponding phases of each of the plurality of electric motors. In this scenario, each of the electric motors receive an AC voltage provided by the variable voltage source, without or with very little switching of the switches associated with each phase of each additional electric motor. This is obviously highly advantageous over the prior art where individual motors are supplied by a DC-based, and where the DC-AC converters necessitate constant switching.

However, in driving conditions where different torques are required for each of the electric motors, or where one of the wheels start spinning, the set voltages to be applied to each phase of each electric motor will differ from each other. In this case, the control unit controls the variable voltage sources to provide a voltage corresponding to or at least close to the set value of the corresponding phase voltage of the main electric motor, plus a common offset voltage that is common to each of said variable voltage sources. For each of the phases of the additional electric motors, it is switched between the neutral switching state, positive parallel switching state and—in preferred embodiments also the negative parallel switching state to thereby apply an effective voltage corresponding to the set value of the corresponding phase voltage. Herein, the common offset voltage of the variable voltage sources ensures that the desired effect voltage can actually be obtained.

Note that in this first embodiment, the task of controlling the voltage of the variable voltage source "in consideration of the effective voltages applied to the phases of the additional electric motors" is very simple, because in this first embodiment, the phases of the additional electric motors are either decoupled from the variable voltage source (neutral switching state), or are connected in parallel with the variable voltage source (positive/negative parallel switching state), but both of this has no bearing on the voltage received by the phase of the main electric motor. So as far as the main electric motor is concerned, it would be sufficient that the variable voltage source provides a voltage corresponding to the set value of the phase voltage to be applied to the main electric motor. However, if the absolute value of the set value for a phase voltage of additional electric motor should be higher than that of the main motor, this can obviously not be reached just by switching between the neutral and positive/negative parallel switching states. For this reason, a sufficiently high common offset to the voltage of the variable voltage source is to be provided, and this amounts to a simple case of what is referred to in the invention as "controlling the variable voltage source to provide a voltage ensuring that an effective voltage corresponding to the set value of the corresponding phase voltage of the main electric motor is applied, in consideration of the effective voltage applied to the phase of the additional electric motor by switching said plurality of switches associated with said phase"

In simple embodiments, said common offset voltage may be a constant voltage. In alternative embodiments, the common offset voltage is dynamically determined, based on the set values of the phase voltages to be applied to each phase of each electric motor of said plurality of electric motors, and in particular such that the absolute value of said common offset voltage is as small as possible while still allowing voltages according to the set values of the phase voltages of each of the additional electric motors to be applied at each instance in time. For example, in some embodiments, the maximum of the absolute values of each of the set values for the phase voltages of the additional electric motors is used at said common offset voltage.

In a second preferred embodiment, the control unit is configured to control said plurality of switches associated with a given phase of a given additional electric motor to selectively establish a switching state selected from said neutral switching state, said positive serial switching state and preferably also said negative serial switching state, to thereby apply an effective voltage to said given phase corresponding to the set value of the corresponding phase voltage, and said control unit is configured to control each of said variable voltage sources to provide a voltage corresponding to or at least close to the sum of the absolute values of the set values of the corresponding phase voltages of the plurality of electric motors.

In this second embodiment, simply put, the phases of the additional electric motors are selectively switched in series or in anti-series with the corresponding phase of the main electric motor, or are bypassed (neutral switching state), to thereby receive an effective voltage corresponding to the set value of the corresponding phase voltage. To ensure that each phase of the main electric motor receives a phase voltage corresponding to its set value, the corresponding variable voltage source is controlled to provide a voltage corresponding to at least close to the sum of the absolute values of the set values of the corresponding phase voltages of the plurality of electric motors, since in this case, the voltage provided by the variable voltage source is divided among the phases of the various electric motors connected in series. This is a further example of the general feature of "controlling the variable voltage source to provide a voltage ensuring that an effective voltage corresponding to the set value of the corresponding phase voltage of the main electric motor is applied, in consideration of the effective voltage applied to the phase of the additional electric motor by switching said plurality of switches associated with said phase".

This second embodiment is particularly useful in cases where the main electric motor is designed for higher power than the additional electric motors, and/or for applications where the one or more additional electric motor is only provided to provide supplementary torque.

While the first and second embodiments are particularly illustrative for understanding the principle of the invention, the skilled person will appreciate that combinations of these embodiments are possible and within the scope of the present invention, i.e. scenarios where the phases of additional electric motors may be switched selectively in series/anti-series with the corresponding phase of the main electric motor as well as parallel/anti-parallel with the variable voltage source, to exploit the full potential of the invention.

In a preferred embodiment, the main electric motor has a single phase terminal per phase, and wherein applying a phase voltage to said phase comprises applying said phase voltage between said single phase terminal and a star point at which windings corresponding to the individual phases are connected.

In preferred embodiments, the one or more additional electric motors have two phase terminals per phase, wherein applying a phase voltage to said phase comprises applying said phase voltage between the two phase terminals.

In a related embodiment, said plurality of switches associated with a given phase of a given additional electric motor are arranged in a bridge circuit topology having two branches including two switches each, wherein one of said two phase terminals is connected with an intermediate point between the switches in one branch, and the other of said two phase terminals is connected with an intermediate point between switches in the other branch.

In a preferred embodiment, said control unit is configured to control switching of the plurality of switches associated with a given phase of a given additional electric motor according to a PWM modulation, a Delta modulation, a Delta-Sigma modulation or variants thereof, without being limited to this. This way, effective voltages corresponding to the set values of the phase voltages of can be efficiently established.

In a preferred embodiment, the number of phases of each of said plurality of electric motors is 3, and the 3 time-dependent set values for the phase voltages of each of said plurality of electric motors follow sinusoidal functions with same amplitude and frequency and with a phase shift of 120°. Note that in some embodiments, the phase V of the main electric motor can be connected with the phase W of a first additional electric motor and with the phase U of a second additional electric motor, to thereby maintain a relatively constant current on the phase.

In a preferred embodiment, the time-dependent set values of the phase voltages to be applied to the phases of each electric motor of said plurality of electric motors follow a periodic, in particular sinusoidal function characterized by a frequency, an amplitude and a phase offset, and wherein the time-dependent set values of corresponding phase voltages of the main electric motor and at least one of the additional electric motors differ with regard to at least one of said frequency, amplitude, and phase offset. Note that a sinusoidal function is easy to implement, but need not be the most energy efficient choice. In various embodiments, so-called overmodulation is employed, such as space vector modulation or third harmonics.

In a preferred embodiment, said control unit is configured to determine or receive information regarding the time dependent impedances of each phase of each of said plurality of electric motors, and to determine said time-dependent set values of said phase voltages to be applied to each phase of each electric motor of said plurality of electric motors based thereon. The precise way of determining estimating the time-dependent impedance of each phase of the plurality of electric motors depends on the structure of the electric motor, and shall not be described in detail here. For each type of electric motor, corresponding formulae are known in the field.

In preferred embodiments, the electric motors are traction motors of an electric vehicle. Herein, the number of additional electric motors is preferably 1 or 3. In a particularly preferred embodiment, the plurality of electric motors comprises the main electric motor and 3 additional electric motors which are each associated with a corresponding one of four wheels of said electric vehicle.

In a preferred embodiment, each of said variable voltage sources is formed by a modular energy storage direct converter system comprising a converter arm comprising a plurality of sequentially interconnected standard modules. The term "standard module" shall indicate that the various modules are of same or a similar type, and is further introduced to distinguish from "motor modules" introduced below. No further limitation is intended by this terminology. Each standard module comprises
- at least one first terminal and at least one second terminal,
- a storage element for electrical energy, in particular a battery, or an energy conversion element, and
- a plurality of module switches, wherein in each two adjacent standard modules, the at least one first terminal of one standard module is connected either directly or via an intermediate component to the at least one second terminal of the other standard module. Herein, said plurality of module switches of the standard modules allow at least for selectively deactivating the storage element or energy conversion element of each standard module and for connecting storage elements or energy conversion elements of adjacent standard modules in series. Moreover, said control unit is configured to receive information regarding the current charge state of the storage elements or voltage or output power of the energy conversion elements, and is configured for actuating at least a part of said plurality of module switches depending on the current charge state of the storage elements or the current output power of voltage of the energy conversion elements such that the converter arm as a whole supplies said variable voltage.

The generic term "modular energy storage direct converter system" used herein derives from the fact that it is "modular" by being built up of standard modules, is capable of storing energy by means of energy storage elements, and is a "direct converter system" in as much as it is designed to actuate at least a part of said plurality of module switches, depending on the current state of charge of the storage elements (or on the current power or voltage of the energy conversion elements) in such way that the converter arm as a whole already supplies a desired voltage so that no further converter for an electric motor is needed.

Such a modular energy storage direct converter system is the preferred choice for the variable voltage source to be used in systems according to the invention. While in the specific embodiments described herein, each of the standard modules comprise a battery, it is noted that the invention is not limited to this, as the invention is also applicable to systems where other energy storage elements are employed, for example redox flow cells, or to systems where the standard modules comprise energy conversion elements such as solar cells, fuel cells or thermocouple elements. Accordingly, wherever in the following description explanations are made with regard to a system based on batteries, it is to be understood that the corresponding disclosure should relate, where applicable, also to other forms of energy storage elements, or energy conversion elements, without further mention.

Using the modular energy storage director converter system as defined above as the variable voltage source has a number of important advantages. For example, since the voltages associated with each individual energy storage elements/energy conversion elements can be comparatively low, the module switches do not have to switch high voltages. This for example allows for using standard low-voltage silicon MOSFETs instead of more expensive IGBTs or silicon carbide-MOSFETs. Moreover, the energy efficiency of the system based on the modular energy storage direct converter as the variable voltage source allows for a better energy efficiency, and an increased flexibility with regard to the charging processes, since under suitable control of the module switches, the energy storage converter system can be charged with practically any external voltage. Moreover, switching of lower voltages by the module switches allows for a better electromagnetic compatibility and reduced total harmonic distortion.

In a preferred embodiment, said plurality of module switches of the standard modules further allow for selectively connecting storage elements or energy conversion elements of adjacent standard modules in anti-series. This could for example be helpful for measuring the state of health or the state of charge of the batteries included in the standard modules.

In a particular preferred embodiment, at least the standard modules which are not the first and last in the sequential interconnection each comprise at least two first terminals and at least two second terminals, wherein in each two adjacent standard modules the at least two first terminals of one standard module are connected either directly or via an intermediate component to a corresponding one of the at least two second terminals of the other standard module, and wherein said plurality of module switches of the standard modules further allow for selectively connecting storage elements or energy conversion elements of adjacent standard modules in parallel. This way, the internal resistance of the energy storage direct converter and hence the internal loss can be reduced.

In a particularly preferred embodiment, the plurality of module switches of the standard modules allow for connecting storage elements or energy conversion elements of standard modules which are separated by at least one intermediate standard module with a deactivated storage element/conversion element selectively in parallel and in series. This variant has at least two significant advantages. One advantage is that in case one of the standard modules or its energy storage should be defective, the operation of the remaining modules is not compromised. The other advantage is that even non-adjacent energy storage elements/conversion elements can be selectively switched in parallel. This allows for selectively connecting energy storage/conversion elements in parallel that have identical voltages to thereby avoid balancing currents/charge transfer between energy source/conversion elements, which would only lead to internal losses.

In a preferred embodiment, the system comprises a plurality of variable voltage sources formed by converter arms which are connected in a ring topology or a star topology.

A further aspect of the invention relates to method for supplying AC driving voltages to a plurality of electric motors, wherein said plurality of electric motors comprise a main electric motor and one or more additional electric motors, wherein each phase of said main electric motor is connected or connectable to a corresponding variable voltage source, and wherein with each phase of each of said one or more additional electric motors a plurality of switches is associated, allowing for selectively acquiring a neutral switching state, in which the phase of said additional electric motor is not receiving energy from said variable voltage source, and at least one of a positive parallel switching state, in which the phase of the additional electric motor lo is connected in parallel with the variable voltage source, and a positive serial switching state, in which the phase of the additional electric motor is connected in series with the corresponding phase of the main electric motor, wherein the method comprises the steps of:

generating or receiving a time-dependent set value of a phase voltage to be applied to each phase of each electric motor of said plurality of electric motors, switching of the plurality of switches associated with a given phase of a given additional electric motor between switching states including said neutral switching state and at least one of said positive parallel and positive serial switching states, to thereby apply an effective voltage to said given phase corresponding to the set value of the corresponding phase voltage, and controlling each of said variable voltage sources to provide a voltage corresponding to or at least close to a voltage ensuring that an effective voltage corresponding the set value of the corresponding phase voltage of the main electric motor is applied to each of its phases, in consideration of the effective voltages applied to the phases of the additional electric motors by switching said plurality of switches associated with these phases.

In a preferred embodiment of the method, said plurality of switches associated with each phase of each of said additional electric motors further allow for acquiring at least one of a negative parallel switching state, in which the phase of the additional electric motor is connected anti-parallel with the variable voltage source and a negative serial switching state, in which the phase of the additional electric motor is connected in anti-series with the corresponding phase of the main electric motor.

In a preferred embodiment, the method further comprises a step of controlling said plurality of switches associated with a given phase of a given additional electrical motor to selectively establish a switching state selected from said neutral switching state, said positive parallel switching state and preferably also said negative parallel switching state, to thereby apply an effective voltage to said given phase corresponding to the set value of the corresponding phase voltage, and controlling each of said variable voltage sources to provide a voltage corresponding to or at least close to the set value of the corresponding phase voltage of the main electric motor plus a common offset voltage that is common to each of said variable voltage sources.

In a preferred embodiment, said common offset voltage is a constant voltage.

In a preferred embodiment, the method further comprises a step of dynamically determining said common offset voltage, based on the set values of the phase voltages to be applied to each phase of each electric motor of said plurality of electric motors, and in particular such that the absolute value of said common offset voltage is as small as possible while still allowing voltages according to the set values of the phase voltages of each of the additional electric motors to be applied at each instance in time.

Preferably, the method further comprises a step of controlling said plurality of switches associated with a given phase of a given additional electrical motor to selectively establish a switching state selected from said neutral switching state, said positive serial switching state and preferably also said negative serial switching state, to thereby apply an effective voltage to said given phase corresponding to the set value of the corresponding phase voltage, and of controlling each of said variable voltage sources to provide a voltage corresponding to or at least close to the sum of the absolute values of the set values of the corresponding phase voltages of the plurality of electric motors.

In a preferred embodiment, said main electric motor is designed for higher power than the additional electric motors.

In a preferred embodiment, the main electric motor has a single phase terminal per phase, wherein applying a phase voltage to said phase comprises applying said phase voltage between said single phase terminal and a star point at which windings corresponding to the individual phases are connected.

In a preferred embodiment, the one or more additional electric motors have two phase terminals per phase, wherein applying a phase voltage to said phase comprises applying said phase voltage between the two phase terminals.

In a related embodiment, said plurality of switches associated with a given phase of a given additional electric motor are arranged in a bridge circuit topology having two branches including two switches each, wherein one of said two phase terminals is connected with an intermediate point between the switches in one branch, and the other of said two phase terminals is connected with an intermediate point between switches in the other branch.

In a preferred embodiment, the method further comprises a step of controlling switching of the plurality of switches associated with a given phase of a given additional electric motor according to a PWM modulation, a Delta modulation, or a Delta-Sigma modulation.

Preferably, the number of phases of each of said plurality of electric motors is 3, and the 3 time-dependent set values for the phase voltages of each of said plurality of electric motors follow sinusoidal functions with same amplitude and frequency and with a phase shift of 120°.

In a preferred embodiment, the time-dependent set values of the phase voltages to be applied to the phases of each electric motor of said plurality of electric motors follow a periodic, in particular sinusoidal function characterized by a frequency, an amplitude and a phase offset, and the time-dependent set values of corresponding phase voltages of the main electric motor and at least one of the additional electric motors differ with regard to at least one of said frequency, amplitude, and phase offset.

In a preferred embodiment, the method further comprises a step of determining or receiving information regarding the time dependent impedances of each phase of each of said plurality of electric motors, and of determining said time-dependent set values of said phase voltages to be applied to each phase of each electric motor of said plurality of electric motors based thereon.

In a preferred embodiment, the electric motors are traction motors of an electric vehicle, wherein in particular, the number of additional electric motors is 1 or 3, wherein preferably, the main electric motor and the 3 additional electric motors are each associated with a corresponding one of four wheels of said electric vehicle.

In a preferred embodiment, each of said variable voltage sources is formed by a modular energy storage direct converter system comprising a converter arm comprising a plurality of sequentially interconnected standard modules, wherein each standard module comprises at least one first terminal and at least one second terminal, a storage element for electrical energy, in particular a battery, or an energy conversion element, and a plurality of module switches, wherein in each two adjacent standard modules the at least one first terminal of one standard module is connected either directly or via an intermediate component to the at least one second terminal of the other standard module, wherein said plurality of module switches of the standard modules allow at least for selectively deactivating the storage element or energy conversion element of each standard module and for connecting storage elements or energy conversion elements of adjacent standard modules in series, wherein said method further comprises a step of receiving information regarding the current charge state of the storage elements or voltage or output power of the energy conversion elements, and of actuating at least a part of said plurality of module switches depending on the current charge state of the storage elements or the current output power of voltage of the energy conversion elements such that the converter arm as a whole supplies said variable voltage.

In a related embodiment, said plurality of module switches of the standard modules further allow for selectively connecting storage elements or energy conversion elements of adjacent standard modules in anti-series.

In a preferred embodiment, at least the standard modules which are not the first and last in the sequential interconnection each comprise at least two first terminals and at least two second terminals, wherein in each two adjacent standard modules the at least two first terminals of one standard module are connected either directly or via an intermediate component to a corresponding one of the at least two second terminals of the other standard module, and wherein said plurality of module switches of the standard modules further allow for selectively connecting storage elements or energy conversion elements of adjacent standard modules in parallel, and preferably allow for connecting storage elements or energy conversion elements of standard modules which are separated by at least one intermediate standard module with a deactivated storage element/conversion element selectively in parallel and in series.

In a preferred embodiment, a plurality of variable voltage sources are employed which are formed by converter arms which are connected in a ring topology or a star topology.

SHORT DESCRIPTION OF THE FIGURES

Figure 7A:
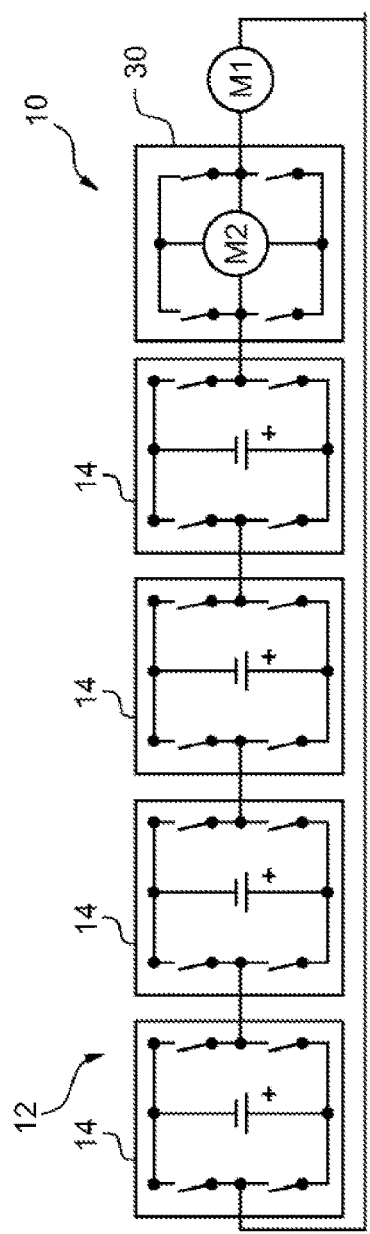
FIG. 7a is a schematic representation of a system according to an embodiment of the invention with one main motor and one additional motor to be connected selectively in series.
Figure 7B:
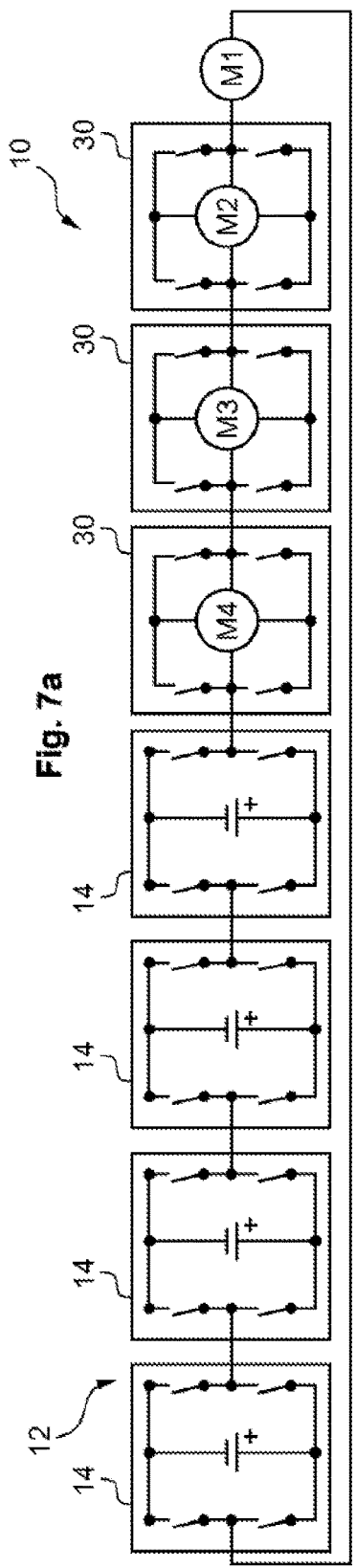
FIG. 7b is a schematic representation of a system similar to that of FIG. 7a, but with one main and three additional motors to be connected selectively in series.
Figure 7C:
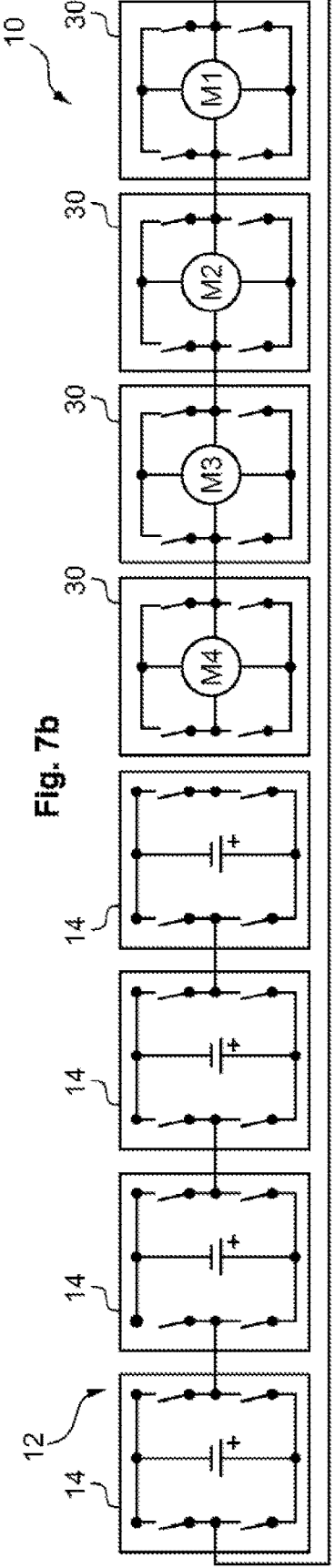
FIG. 7c is a schematic illustration of the system similar to that of FIG. 7b, in which the main motor is embedded in a motor module.
Figure 8:
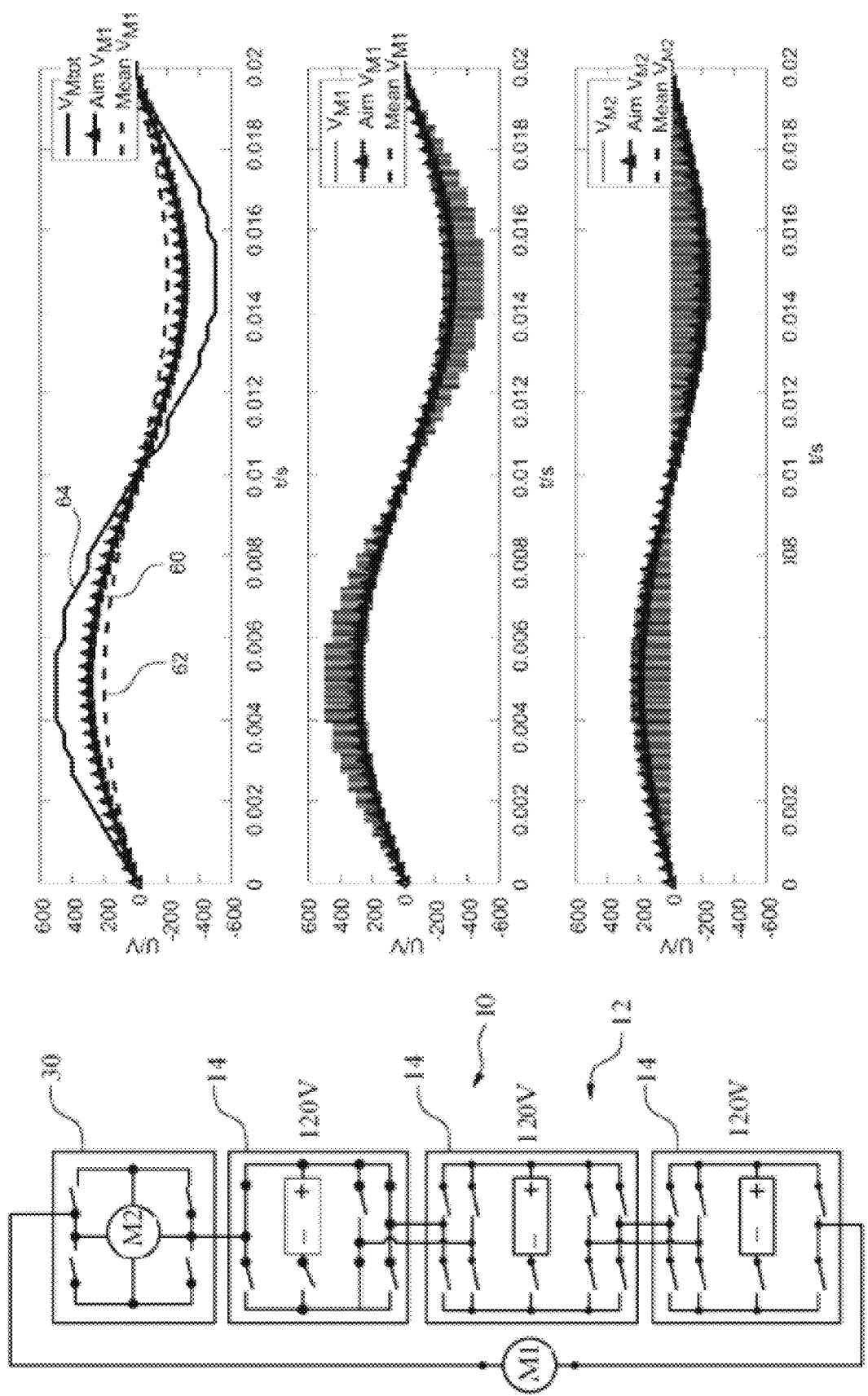

FIG. 8 schematically illustrates the operation of the systems of FIG. 7a to 7c.

Figure 9:
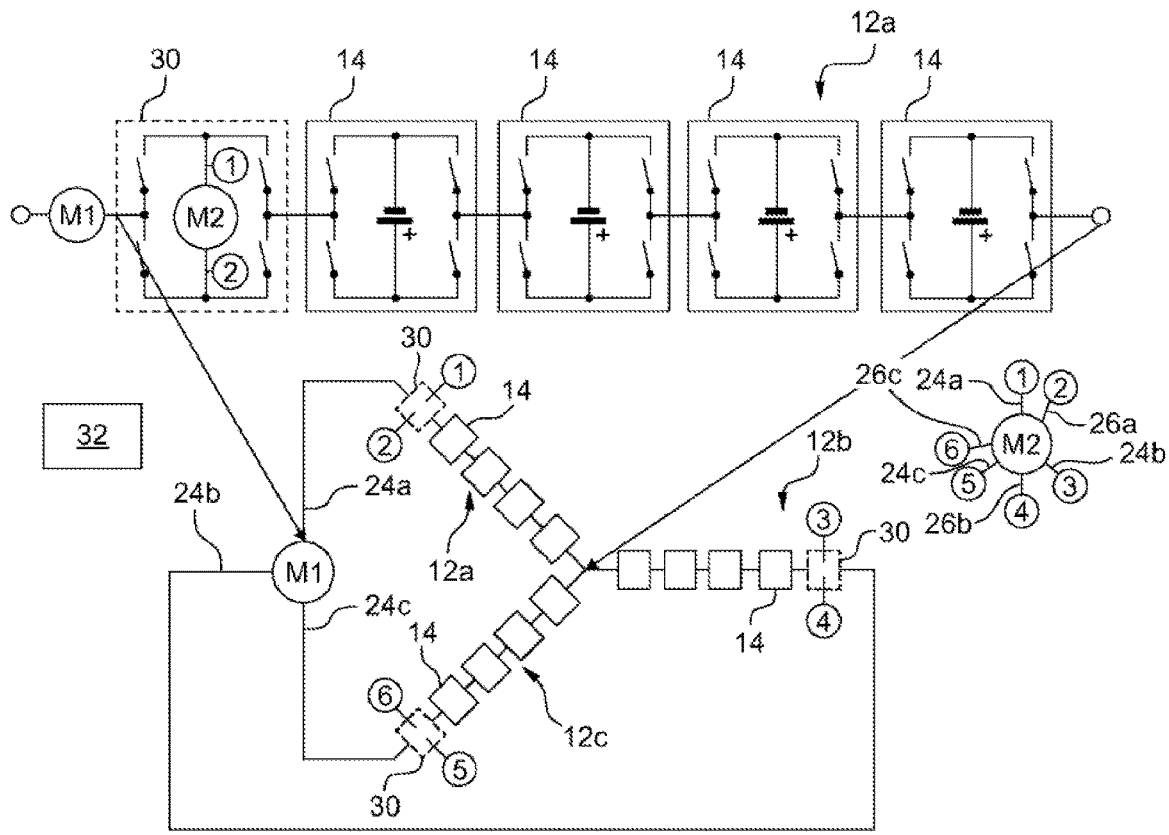

FIG. 9 is a schematic representation of a system according to an embodiment of the invention including a main and one additional motor connected selectively in series and with converter arms connected in star configuration.

Figure 10:
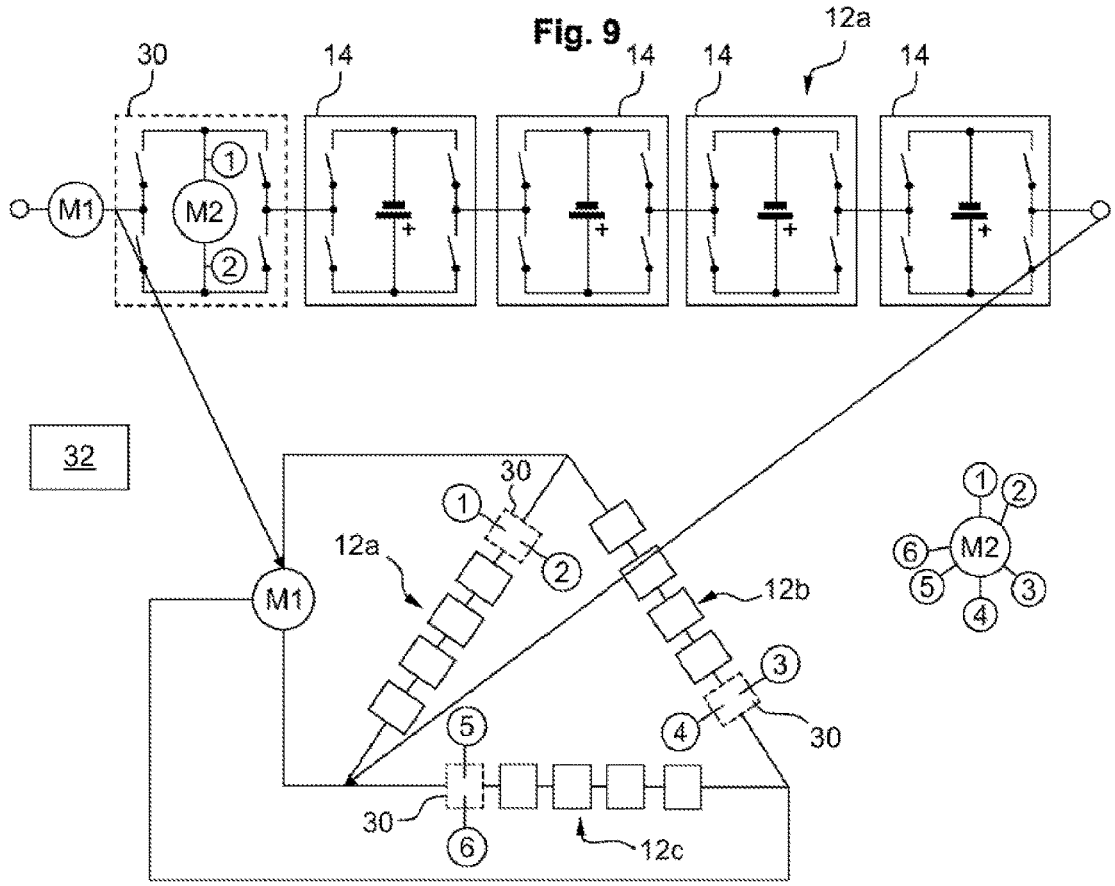

FIG. 10 is a schematic representation of a system according to an embodiment of the invention including a main and one additional motor connected selectively in series and with converter arms connected in ring configuration.

Figure 11:
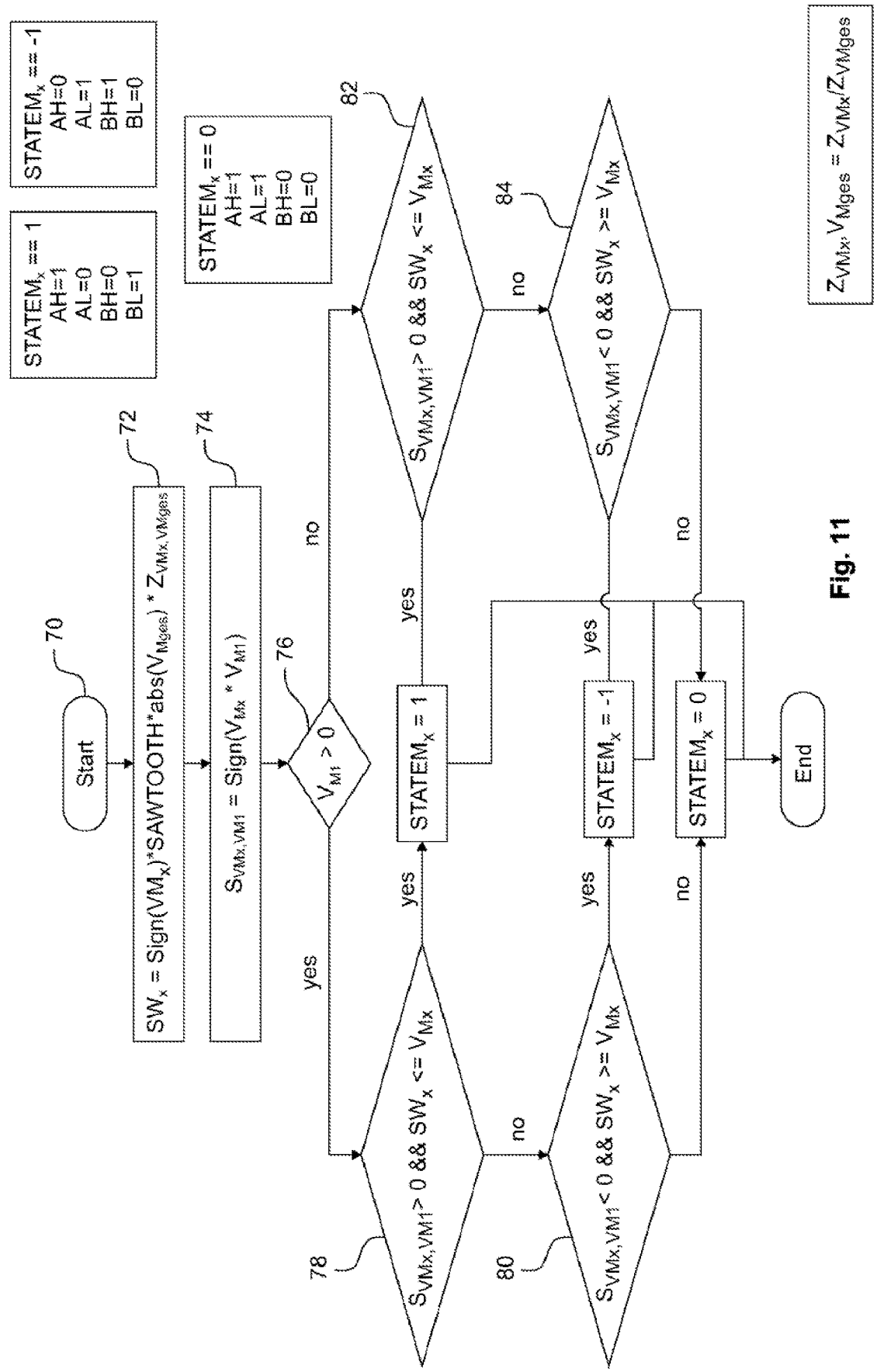

FIG. 11 is a process diagram illustrating the control of the motor modules of FIGS. 9 and 10.

FIGS. 12a to 12c are schematic presentation of system similar to those of FIG. 7a to FIG. 7c, in which the motor modules have a half bridge topology.

FIGS. 13a to 13d show exemplary standard modules for use in modular energy storage direct converter systems to be used as variable voltage sources in embodiments of the invention.

Figure 14:
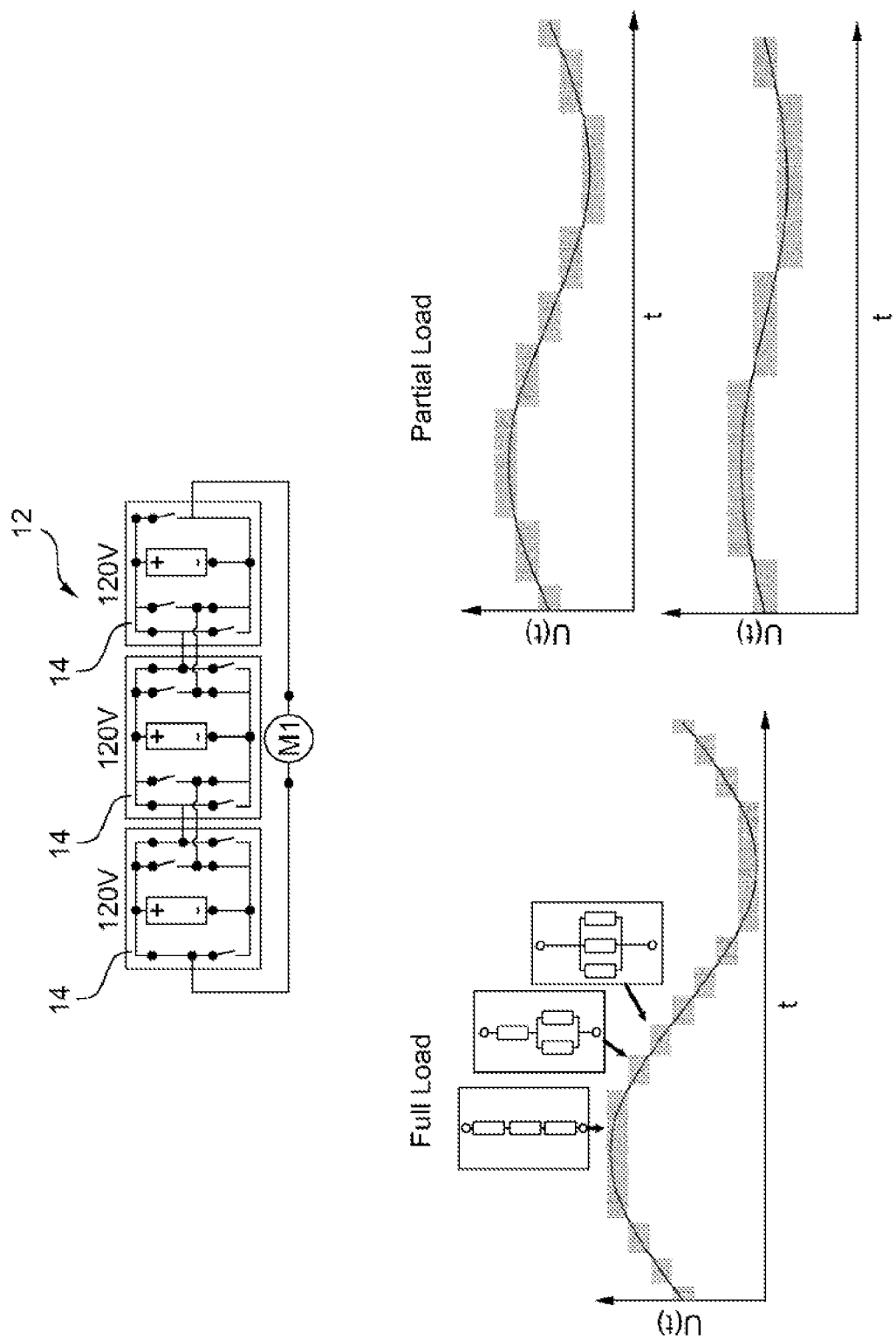

FIG. 14 shows diagrams illustrating the operation principles of a modular and storage direct converter.

Figure 15:
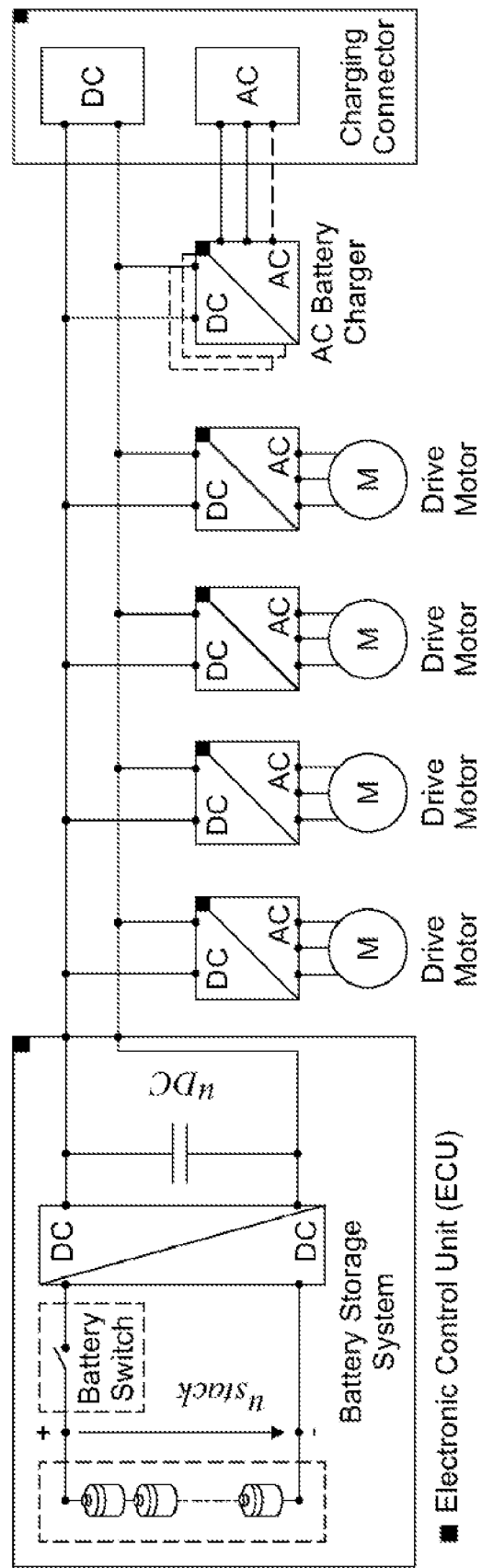

FIG. 15 illustrates a prior art system for supplying AC driving voltages to a plurality of electric motors.

DESCRIPTION OF THE PREFERRED EMBODIMENTS

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

Figures 1A, 1B, 1C:
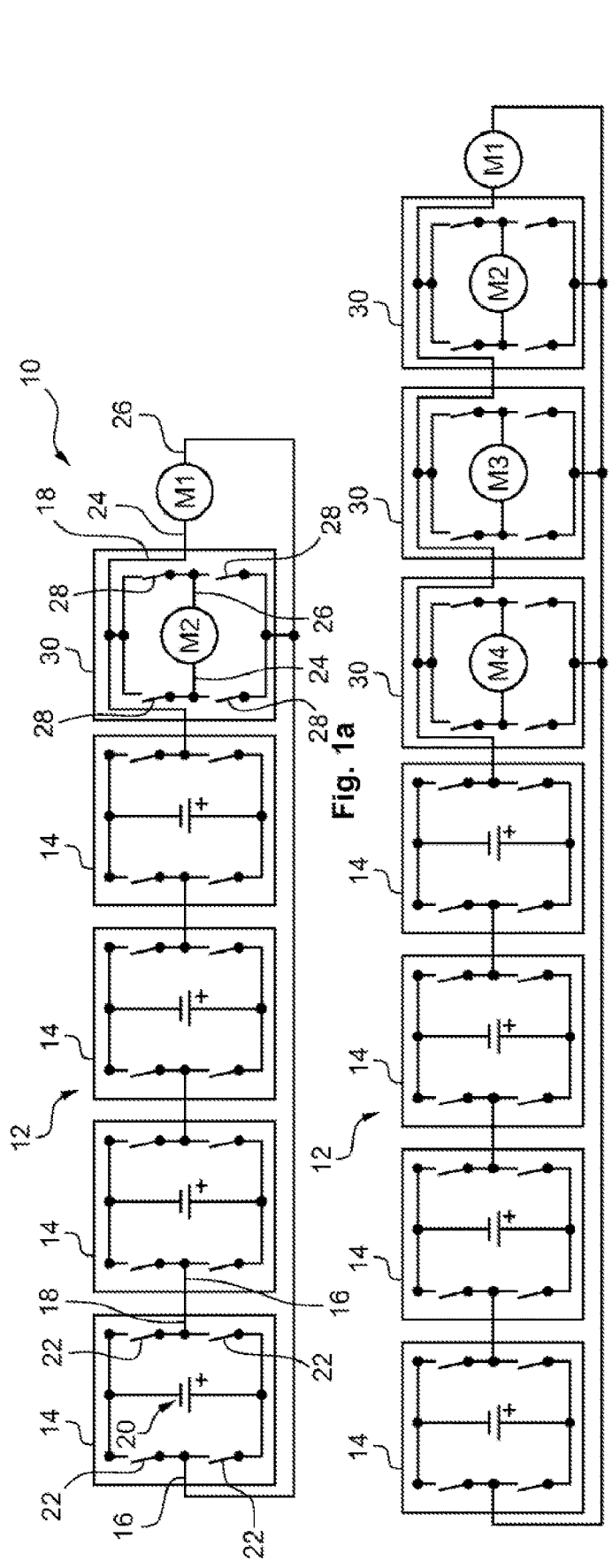
FIG. 1a is a schematic representation of a system according to an embodiment of the invention with one main motor and one additional motor to be connected selectively in parallel.
FIG. 1b is a schematic representation of a system similar to that of FIG. 1a, but with one main and three additional motors to be connected selectively in parallel.
FIG. 1c is a schematic illustration of the system similar to that of FIG. 1b, in which the main motor is embedded in a motor module.

FIG. 1a shows an embodiment of a system 10 for supplying driving voltages to two electric motors, a main electric motor M1 and an additional electric motor M2. The system comprises a variable voltage source 12, which in the embodiment shown is formed by a modular energy storage direct converter comprising a converter arm formed by a plurality of sequentially interconnected standard modules 14, of which in FIG. 1a only four exemplary ones are shown for simplicity. Each of the standard modules 14 comprises a first terminal 16 and a second terminal 18, a battery 20 and four module switches 22. As is seen from FIG. 1a, in each adjacent two standard modules 14, the first terminal 16 is directly connected with the second terminal 18 of the other adjacent standard module 14. While not shown herein, in alternative embodiments, the terminals of adjacent standard modules could be connected not directly, but via an intermediate component.

In the embodiment of FIG. 1a, the standard modules 14 have the topology of a full bridge circuit having two branches including two switches 22 each, wherein each pole of the battery 20 is connected with a respective intermediate point between the switches 22 in one of the two branches. With this full bridge topology, by switching the module switches 22, it is possible to selectively deactivate or "bypass" the battery 20 of each standard module 14, as well as to connect batteries 20 of adjacent modules 14 in series and in anti-series. Under control of a control unit (not shown for clarity) of the system 10, the module switches 22 can be selectively actuated such that the converter arm as a whole supplies a desired variable voltage. More details about the operation and different designs of suitable modular energy storage direct converters are presented with reference to FIGS. 13 and 14 below. For the time being it is sufficient to appreciate that the modular energy storage multilevel converter forming the variable voltage source 12 allows for outputting a variable voltage under the control of a control unit (not shown).

In the simple embodiment shown in FIG. 1a, the main electric motor M1 and the additional electric motor M2 each have a single phase only, and two phase terminals 24, 26 associated with the phase. The phase terminals 24, 26 of the main electric motor M1 are permanently connected with the "terminals" of the variable voltage source 12, i.e. with the second terminal 18 of the rightmost and the first terminal 16 of the leftmost standard module 14 in the converter arm shown in FIG. 1a. Accordingly, the output voltage of the variable voltage source 12 is permanently applied to the (single) phase of the main electric motor M1.

As is further seen in FIG. 1a, four switches 28 are associated with the (single) phase of the additional electric motor M2 which are arranged in a motor module 30. These switches 28 allow for selectively acquiring, under control of the control unit (not shown), a neutral switching state, in which the phase of the additional electric motor M2 is not receiving energy from said variable voltage source 12, a positive parallel switching state, in which the phase of the additional electric motor M2 is connected in parallel with the variable voltage source 12, and a negative parallel switching state, in which the phase of the additional electric motor M2 is connected antiparallel with the variable voltage source.

By rapidly switching the switches 28 associated with the phase of the additional motor M2 between these switching states, an effective voltage may be applied to the phase of the additional motor M2 that meets a set value of its phase voltage. Note that in this embodiment, in the positive parallel switching state, the additional electric motor M2 is not only connected in parallel with the variable voltage source 12, but also parallel with the main electric motor M1. However, the latter feature is not mandatory, as will be shown with reference to FIG. 2 below.

FIG. 1b shows a related variant, where three additional electric motors M2, M3, M4 are provided in communication with the main motor M1. Each of the additional electric motors M2, M3 and M4 are arranged in a corresponding motor module 30 comprising a plurality of switches 28 of the same time as described with reference to FIG. 1a above.

Finally, FIG. 1c shows a further related variant, where again three additional electric motors M2, M3 and M4 are provided, but wherein the main motor M1 is likewise embedded in a motor module 30.

Figure 2:
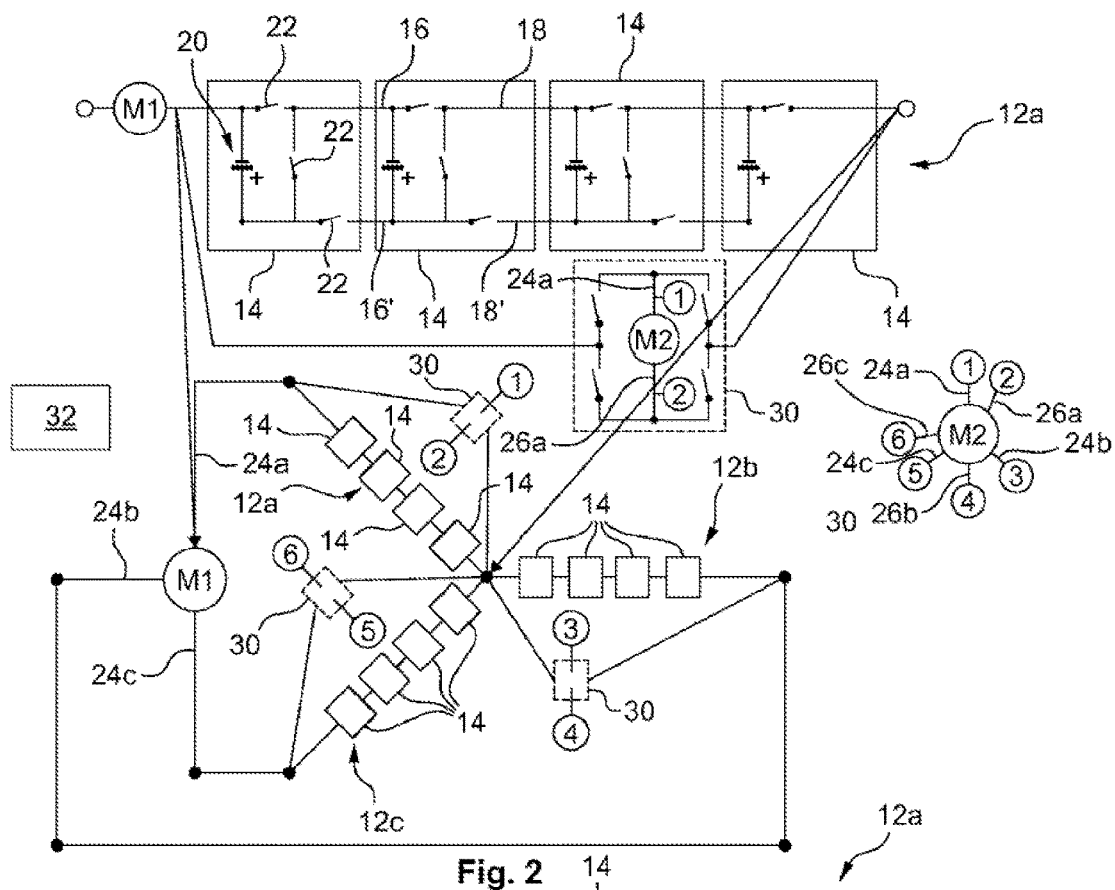
FIG. 2 is a schematic representation of a system according to an embodiment of the invention including a main and one additional motor connected selectively in parallel and with converter arms connected in star configuration.

In most applications, the electric motors will have three phases rather than just one. A corresponding embodiment is shown in FIG. 2. FIG. 2 shows a further system 10 for supplying AC driving voltages to 2 electric motors, namely to a main electric motor M1 and to an additional motor M2. Each of the electric motors M1 and M2 has three phases. As is seen in FIG. 2, a variable voltage source 12a, 12b and 12c is associated with each of the three phases of the main electric motor M1, and each phase of said main electric motor M1 is connected to a corresponding one of the variable voltage sources 12a, 12b and 12c. In the shown embodiment, the main electric motor M1 has a single phase terminal 24a, 24b and 24c per phase connected to one end of the corresponding winding (not shown), while the other ends of the windings are connected at a star point (not shown). This star point of the main electric motor M1 is not to be confused with a star point at which the ends of the individual converter arms (voltage sources 12a, 12b and 12c) in the overall star topology of FIG. 2 are connected. Note that the star point of the main electric motor M1 will likewise typically have a terminal, which is in this embodiment however free-floating and hence not shown in FIG. 2.

Moreover, the additional electric motor M2 has two terminals per phase, namely terminals 24a/26a for the first phase, 24b/26b for the second phase and 24c/26c for the third phase. For clarity, the interconnections of these terminals are not explicitly shown, but indicated by encircled numerals 1 to 6.

With each of the three phases of the additional motor M2, a motor module 30 comprising a plurality of switches 28 is associated. For the first phase, the variable voltage source 12a and the motor module 30 are shown in an enlarged and more detailed illustration, a similar structure applies for the two other phases as well. It is seen that again, the variable voltage source 12a associated with the first phase of the main electric motor M1 is built up from a sequential interconnection of a plurality of standard modules 14, which however are different from those shown in FIG. 1a to FIG. 1c. In this embodiment, each standard module 14 comprises three module switches 22 only. Moreover, different from the standard modules 14 of FIG. 1a to FIG. 1c, each standard module 14—except for the first and last standard modules 14 in the sequence—comprises two first terminals 16, 16' and two second terminals 18, 18' and the module switches 22 allow for switching batteries 20 in adjacent standard modules 14 selectively in series and in parallel, and further allow each battery 20 to be bypassed.

In the enlarged version of the motor module 30, it is seen that plurality of switches 28 associated with the first phase of a the additional electric motor M2 are arranged in a bridge circuit topology having two branches including two switches 28 each, wherein one of the two phase terminals 24a, 26a is connected with an intermediate point between the switches 28 in one branch, and the other of said two phase terminals 24a, 26a is connected with an intermediate point between switches in the other branch.

A control unit 32 is provided which is configured to generate or to receive from some further control device a time-dependent set value of a phase voltage to be applied to each of the three phases of each of the main electric motor M1 and additional motor M2. In typical applications, the time-dependent set values of the phase voltages to be applied to the phases of each electric motor M1, M2 follow a periodic, in particular sinusoidal function characterized by a frequency, an amplitude and a phase offset. In the embodiment shown in FIG. 2, it is assumed that the electric motors M1 and M2 are of identical construction and are associated with corresponding wheels of an electric vehicle. When the vehicle is driven along a straight road with similar traction of the two wheels on the ground, the main additional electric motors M1 and M2 should generate identical torques, and accordingly, the set values for the phase voltages for corresponding phases for the main and additional electric motors M1, M2 will be the same. In this case, the control unit 32 controls the actuation of the module switches 22 of the standard modules 14 of the variable voltage sources 12a, 12b, 12c, such that the converter arm of each variable voltage source 12a, 12b, 12c as a whole supplies the set value of the phase voltage of the corresponding phase of the main motor M1, and by actuating the switches 28 of the motor module 30, the corresponding phase of additional electric motor M2 is connected in parallel with the variable voltage source 12a, 12b or 12c. Note that the corresponding phase of M1 and M2 are not connected in parallel, because the star point of the main electric motor M1 is free-floating and not connected with the start point at which the ends of the converter arms of the variable voltage sources 12a, 12b and 12c are connected, which would then lead to a true parallel connection of the phases of M1 and M2. However, if all of the motor modules 30 are constantly switched to the positive parallel switching state, the voltage at the star point (not shown) of the main electric motor M1, and the voltage at the star point at which the ends of the converter arms of the variable voltage sources 12a, 12b and 12c are connected would acquire the same potential, such that one could argue that in this operation mode, the corresponding phases of M1 and M2 are "effectively" in parallel with each other and with the corresponding variable voltage source 12a, 12b, 12c, such that they will indeed receive the same phase voltage. As long as the set values for the corresponding phase voltages of the main and additional motors M1, M2 do not differ, the positive parallel switching state is hence maintained, meaning that under normal driving conditions, no switching is required.

However, if the vehicle moves in a curve, or if the traction of the individual tires should differ, this should be accounted for by individually adjusting the torques provided by the main and additional motors M1, M2. This means that the time-dependent set values of corresponding phase voltages of the additional electric motor M2 will differ from that of M1 with regard to at least one of said frequency, amplitude, and phase offset. Then, by selectively switching the plurality of switches 28 in the motor modules 30 to acquire one of the neutral switching state, positive parallel switching state or negative switching state, under the control of the control unit 32, an effective voltage is applied to any given phase according to the set value of the corresponding phase voltage of the additional motor M2. For this purpose, the control unit 32 is configured to control switching of the plurality of switches 28 associated with a given phase of the additional electric motor M2 according to a PWM modulation, a Delta modulation, a Delta-Sigma modulation or any related or other pulse modulation scheme.

Note that in the embodiment illustrated in FIG. 2, the control unit 32 is meant to be coupled for control with each of the switches 28 of the motor modules 30 and with the module switches 22 of each of the standard modules 14 of the variable voltage sources 12a, 12b, 12c by suitable signal lines or signal links, which are however not shown in the figure for clarity.

Figure 3:
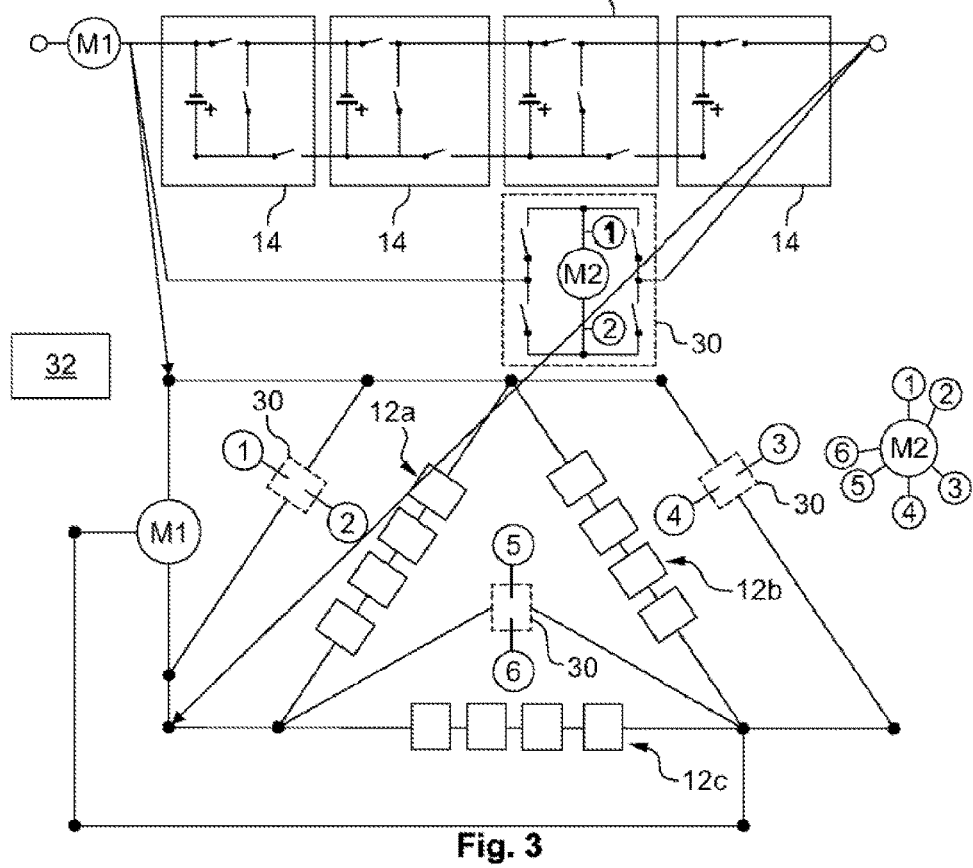
FIG. 3 is a schematic representation of a system according to an embodiment of the invention including a main and one additional motor connected selectively in parallel and with converter arms connected in ring configuration.

Note that in FIG. 2, the converter arms of the respective variable voltage sources 12a, 12b, 12c are arranged in a star topology, in which they are connected in a common star point with one of their ends and with a corresponding phase terminal of the main electric motor M1 with their respective other end. FIG. 3 shows an alternative variant, in which the converter arms of the respective variable voltage sources 12a, 12b, 12c are arranged in a ring topology. The remainder of FIG. 3 is analogous to FIG. 2 and, the corresponding description is therefore not repeated.

Figure 5:
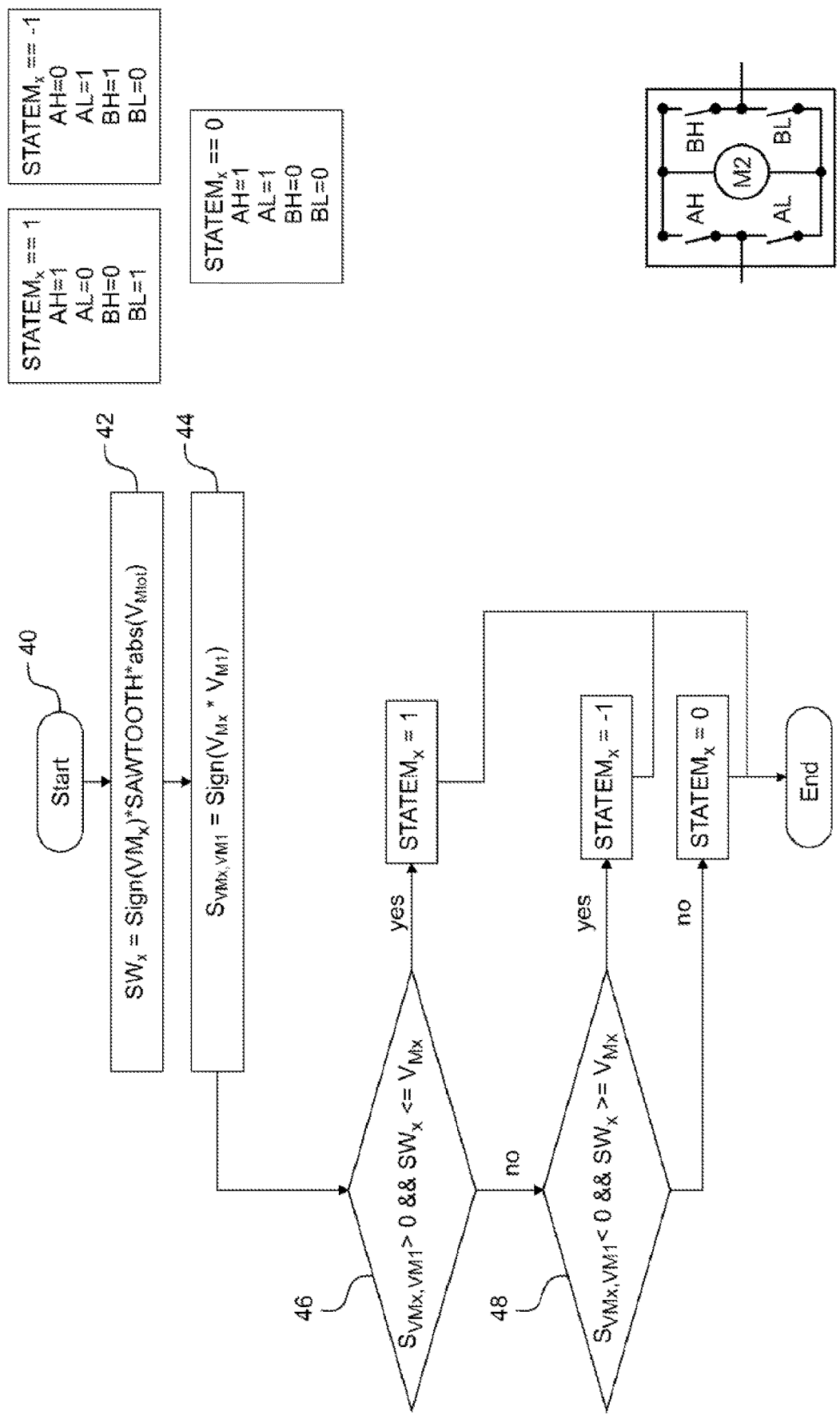
FIG. 5 is a process diagram illustrating the control of the motor modules of FIGS. 2 and 3.

Next, with reference to the flow diagram of FIG. 5, the control of the switches 28 of the motor modules 30 is described in more detail. The general idea is to switch the switches 28 of the motor modules 30 such that each phase of an additional motor Mx receives an effective voltage corresponding to the set value of its phase value $V_{Mx}$, where x is an integer number designating the additional motor. In the flow diagram, for simplicity, only one phase per motor is considered, but the skilled person will appreciate that the same procedure is carried out for each phase in a corresponding manner. Further shown in FIG. 5 is a copy of the motor module 30, in which the switches 28 are further specified as Alpha High (AH), Alpha Low (AL), Beta High (BH) and Beta Low (BL). In the process diagram, the switching state of the motor module 30 is characterized by a switching state variable STATEMx. As is summarized in FIG. 5, STATEMx=1 corresponds to a state where AH and BL are closed and AL and BH are open, which in the configuration of FIG. 2 then corresponds to the positive parallel switching state, STATEMx=−1 corresponds to a state where AH and BL are open and AL and BH are closed, which in the configuration of FIG. 2 then corresponds to the negative parallel switching state, and STATEMx=0 corresponds to a state where AH and AL are closed and BH and BL are open, which in the configuration of FIG. 2 then corresponds to the neutral switching state.

The control process starts in step 40 and in a first step generates a sawtooth signal SWx, by multiplying a standard signal SAWTOOTH which linearly increases from 0 to 1 by the sign of $V_{Mx}$ and the absolute value of the voltage provided by the corresponding variable voltage source 12a, 12b, 12c, which is referred to as $V_{Mtot}$. In the embodiment of FIG. 2, $V_{Mtot}$ corresponds to the set value $V_{M1}$ of the phase voltage of the main motor M1 plus a common offset to each of the phase voltages. Note that this common offset only leads to a shift in the voltage of the star point (not shown) where the windings (not shown) of the phases of the main motor M1 are connected, but does not influence the operation of the main motor M1.

In step 44, it is determined whether the set values of the phase voltage $V_{Mx}$, $V_{M1}$ of the given additional electric motor Mx and the main electric motor M1 have the same sign, or in other words, equal polarity. For this purpose, a variable $S_{VMx, VM1}$ is determined, which is larger than zero if the signs of $V_{Mx}$, $V_{M1}$ are equal and lower than zero if they are different.

In step 46, the motor module 30 is switched into the positive parallel switching state (STATEMx=1), if $S_{VMx, VM1}$>0 and as long as $V_{Mx}$≥SWx. Note that in the setup of FIG. 2, $V_{M1}$ is always positive, such that the criterion $S_{VMx, VM1}$>0 implies that $V_{Mx}$>0.

In step 48, the motor module 30 is switched into the negative parallel switching state (STATEMx=−1), if $S_{VMx, VM1}$<0 (implying that $V_{Mx}$<0) and as long as $V_{Mx}$≤SWx.

If none of the criteria of steps 46 and 48 is fulfilled, the motor module 30 is switched into the neutral state (STATEMx=0). The process shown in FIG. 5 is repeated rapidly, such that a PWM signal is applied to the given phase of the additional motor Mx which leads to an effective voltage corresponding to the sad value of the phase voltage.

Figure 4:
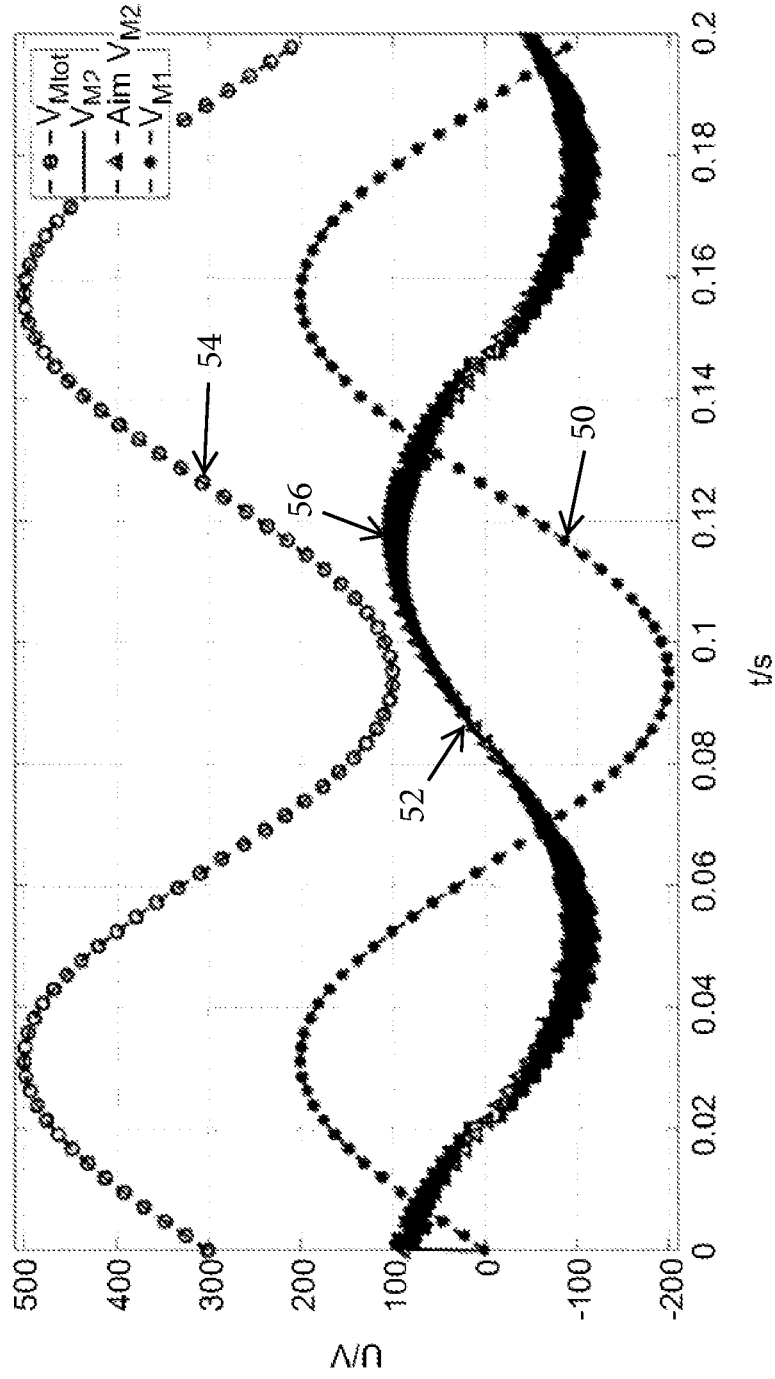
FIG. 4 shows the set values of the phase voltages of the main and the additional motor of FIGS. 2 and 3 as well as the effective votive actually applied to the phase of the additional motor.

The result of this control is shown in FIG. 4. In FIG. 4, the curve 50 represents the time-dependent set value of one phase voltage of the main electric motor M1, which follows a sinusoidal function characterized by a frequency, an amplitude of ±200 V and a phase offset. The curve 52 represents the time-dependent set value of (one phase of) the additional electric motor M2, which likewise follows a sinusoidal function, which differs from the curve 50 by its amplitude (±100 V) and phase offset. Finally, the curve 54 shows the voltage $V_{Mtot}$, which corresponds to $V_{M1}$, plus an offset of 300 V, which is a common offset to all three phases of the main motor M1. One reason for the offset is to ensure that $V_{Mtot}$ may only take on positive values, because the modules 14 shown for the variable voltage source 12a in FIG. 2 allow the batteries to be connected in series, but not in anti-series, or in other words, it is not possible to change the polarity of the converter are as a whole. Accordingly, the variable voltage sources 12a, 12b, and 12c can by construction only provide positive voltages. However, an additional shift of 100 V is provided such that it is ensured that at all times, $V_{Mtot}$ is larger than the absolute value of the set value of the phase voltage $V_{M2}$. Please note that although the "total" amplitude of $V_{M2}$ is 200 V, as it ranges between ±100 V, it is sufficient to ensure that $V_{Mtot}$ at no time drops below 100 V, because the motor module 30 allows for an anti-parallel connection leading to a voltage of opposite polarity as in case of the parallel connection.

Further shown in FIG. 4 is a rapidly oscillating curve 56 which corresponds to the switched voltage or pulse modulated signal applied to the additional electric motor M2. This voltage would theoretically oscillate between zero and $V_{Mtot}$, if the inductance of the motor winding was zero. However, due to inductance of the motor winding, the voltage only oscillates in a limited region around the effective voltage, i.e. around $V_{M1}$.

Figures 6A, 6B, 6C:
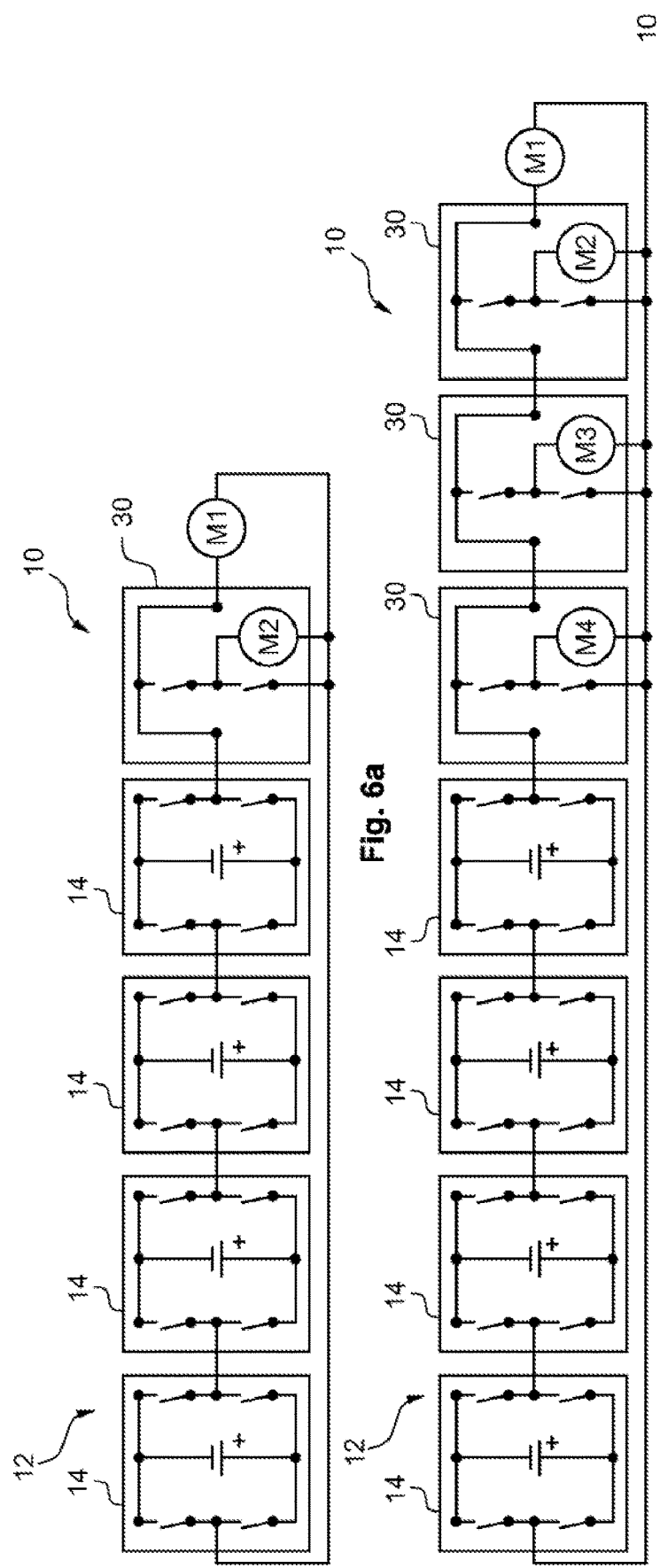
FIGS. 6a to 6c are schematic presentation of system similar to those of FIG. 1a to FIG. 1c, in which the motor modules have a half bridge topology.

FIG. 6a to FIG. 6c show a similar arrangement to that of FIG. 1a to FIG. 1c, the sole difference being a different motor module 30, which has half bridge topology and comprises only two switches 28. This simplified motor module 30 allows for selectively acquiring the neutral switching state and the positive parallel state, but not the negative parallel state.

In a further embodiment, refer to as the "second embodiment" in the summary of the invention, the additional electric motors are not switched in parallel with the the main electric motor, but can be switched in series, and optionally in anti-series with the main motor. An example for this is shown in FIG. 7a, where-similar to FIG. 1a a voltage source 12 is formed as a modular energy storage direct converter comprising a plurality of cascaded standard modules 14, and the additional electric motor M2 is embedded in a motor module 30. By operating the switches 28 of the motor module 30, the additional motor M2 can be connected in series with the main motor M1, in anti-series with the main motor M1, and in a neutral state, where the additional electric motor M2 does not receive energy from the variable voltage source 12. FIG. 7b shows a modification of this setup, where three additional electric motors M2, M3 and M4 are provided instead of just one. Finally, FIG. 7c shows a further modification, where the main electric motor and one is likewise embedded in a motor module 30.

FIG. 8 illustrates the operation of a setup according to FIG. 7a. In this illustration, for simplicity only one phase of each of the main electric motor M1 and the additional electric motor M2 is considered. Also, the modular energy storage direct converter resembling the variable voltage source 12 uses different standard modules 14 than shown in FIG. 7a, the merits of which will be explained below.

In the upper diagram on the right of FIG. 8, the curve 60 represents the time-dependent set value of a phase voltage $V_{M1}$ of the main electric motor M1, and the curve 62 represents the time-dependent set value of the corresponding phase voltage $V_{M2}$ of the additional electric motor M2. In this embodiment, the main electric motor M1 is indeed the motor responsible for the predominant torque, while the additional motor M2 is intended only for occasional support thereof, if needed. Finally, the curve 64 shows the voltage $V_{Mtot}$ provided by the variable voltage source 12.

According to the general principle of the invention, the voltage $V_{Mtot}$ provided by the variable voltage source 12 is chosen such as to ensure that an effective voltage corresponding the set value of the phase voltage $V_{M1}$ of the main electric motor M1 is applied to its phase, in consideration of the effective voltages applied to the phases of the additional electric motors, which are in turn a consequence of switching the plurality of switches 28 associated with the corresponding phases of these additional electric motors. If the motor module 30 of the additional electric motor M2 is switched to the neutral switching state, the full voltage $V_{Mtot}$ provided by the variable voltage source 12 is applied to the main electric motor M1, whereas in positive or negative serial switching state, the voltage $V_{Mtot}$ is split between the main and additional electric motors M1 and M2 according to their impedances. Accordingly, in this case, $V_{Mtot}$ is chosen to correspond to the sum of the absolute values of the set values of the phase voltages $V_{M1}$ and $V_{M1}$ for M1 and M2, respectively. The result is shown in the middle and lower diagram on the right of FIG. 8. It is seen that the voltage applied to the main electric motor M1 fluctuates between $V_{Mtot}$ and $V_{Mtot} \cdot Z_{VM1}/Z_{VMtot}$, while the voltage applied to the additional electric motor M2 fluctuates between zero and $V_{Mtot} \cdot Z_{VM2}/Z_{VMtot}$, wherein $Z_{VM1}$ is the impedance associated with the (phase of the) main electric motor M1, $Z_{VM2}$ is the impedance associated with the (phase of the) additional electric motor M2, and $Z_{VMtot}$ is the total impedance of all phases of the motor currently connected in series, i.e. in this simple case $Z_{VMtot} = Z_{VM1} + Z_{VM2}$. As the skilled person will appreciate, this concept can be extended to larger numbers of electric motors connected in series.

FIGS. 9 and 10 again show preferred arrangements for the case of two electric motors, M1 and M2 having three phases each, which are similar to those of FIGS. 2 and 3. The main difference from FIGS. 2 and 3 is how the additional motor M2 is to be connected as a result of the switching state of its corresponding motor module 30: While in the embodiment of FIG. 2 and FIG. 3, the motor module 30 was connected such as to allow for
- a neutral switching state,
- a positive parallel switching state (in which the phase of the additional electric motor M2 is connected in parallel with the variable voltage source 12/the main electric motor M1), and
- a negative parallel switching state (in which the phase of the additional electric motor M2 is connected anti-parallel with the variable voltage source 12/the main electric motor M1), in the embodiments of FIGS. 9 and 10, the motor modules 30, although of generally similar structure, are connected to allow for
- (again) a neutral switching state,
- a positive serial switching state (in which the phase of the additional electric motor M2 is connected in series with the corresponding phase of the main electric motor M1), and
- a negative serial switching state (in which the phase of the additional electric motor is connected in series with the corresponding phase of the main electric motor).

Next, with reference to the flow diagram of FIG. 11, the control of the switches 28 of the motor modules 30 of FIGS. 9 and 10 is described in more detail. The general idea is again—similar to the embodiments of FIGS. 2 to 5—to switch the switches 28 of the motor modules 30 such that each phase of an additional motor Mx receives an effective voltage corresponding to the set value of its phase value $V_{Mx}$, where x is again an integer number designating the additional motor. Simply speaking, the main difference from the embodiments of FIGS. 2 to 5 is that while in the embodiments of FIGS. 2 to 5, the desired voltages were applied by "selective parallel connection of electric motor phases" in the embodiments of FIGS. 9 to 11, the desired voltages are applied by "selective serial connection of electric motor phases". In the flow diagram of FIG. 11, again for simplicity, only one phase per motor is considered, but the skilled person will appreciate that the same procedure is carried out for each phase in a corresponding manner. It is seen that the motor modules 30 in FIGS. 9 and 10 have the same structure as the motor modules 30 in FIGS. 2 and 3, and the corresponding switches 28 can again be further specified as Alpha High (AH), Alpha Low (AL), Beta High (BH) and Beta Low (BL). In the process diagram of FIG. 11, the switching state of the motor module 30 is characterized by a switching state variable STATEMx. As summarized in FIG. 11, STATEMx=1 corresponds to a state where AH and BL are closed and AL and BH are open, which in the configuration of FIGS. 9 and 10 now corresponds to the positive serial switching state, STATEMx=−1 corresponds to a state where AH and BL are open and AL and BH are closed, which in the configuration of FIGS. 9 and 10 now corresponds to the negative serial switching state, and STATEMx=0 corresponds to a state where AH and AL are closed and BH and BL are open, which in the configuration of FIGS. 9 and 10 again corresponds to the neutral switching state.

The control process starts in step 70 and in a first step 72 generates a sawtooth signal SWx, by multiplying a standard signal SAWTOOTH which linearly increases from 0 to 1 by the sign of $V_{Mx}$ by the absolute value $V_{Mtot}$ of the voltage provided by the corresponding variable voltage source 12a, 12b, 12c, and by a scaling factor $Z_{VMX,VMtot}=Z_{VMx}/Z_{VMtot}$, which indicates which fraction of the total voltage $V_{Mtot}$ applied to a serial connection of a plurality of motors is applied to the given motor Mx. In the embodiment of FIGS. 9 and 10, $V_{Mtot}$ is chosen to correspond to the sum of the absolute values of the set values of the corresponding phase voltages of the plurality of electric motors.

In step 74, it is determined whether the set values of the phase voltage $V_{Mx}$, $V_{M1}$ of the given additional electric motor Mx and the main electric motor M1 have the same sign, or in other words, equal polarity. For this purpose, again the variable $S_{VMx,VM1}$ is determined, which is larger than zero if the signs of $V_{Mx}$, $V_{M1}$ are equal and lower than zero if they are different.

In step 76, it is checked whether $V_{M1}$ is larger than zero or not. According to this distinction, the flow bifurcates in two an alternative branches. If $V_{M1}>0$, then in step 78 the motor module 30 is switched into the positive serial switching state (STATEMx=1), if $S_{VMx,VM1}>0$ (implying that $V_{Mx}$ is likewise >0) and as long as $V_{Mx} \geq SWx$.

In step 80, the motor module 30 is switched into the negative serial switching state (STATEMx=−1), if $S_{VMx,VM1}<0$ (implying that $V_{Mx}$ is <0) and as long as $V_{Mx} \leq SWx$.

If none of the criteria in steps 78 and 80 applies, the motor module 30 is switched into the neutral switching state (STATEMx=0).

However if it is determined in step 76 that $V_{M1}<0$, the process proceeds to step 82, in which the motor module 30 is switched into the positive serial switching state (STATEMx=1), if $S_{VMx,VM1}>0$ (implying that $V_{Mx}$ is likewise <0) and as long as $V_{Mx} \leq SWx$.

In step 84, the motor module 30 is switched into the negative serial switching state (STATEMx=−1), if $S_{VMx,VM1}<0$ (implying that $V_{Mx}$ is >0) and as long as $V_{Mx} \geq SWx$.

If none of the criteria in steps 82 and 84 applies, the motor module 30 is switched into the neutral switching state (STATEMx=0).

FIG. 12a to FIG. 12c show a similar arrangement to that of FIG. 7a to FIG. 7c, the sole difference being a different motor module 30, which has half bridge topology only and comprises only two switches 28. This simplified motor module 30 allows for selectively acquiring the neutral switching state and the positive serial state, but not the negative serial state.

In preferred embodiments, the variable voltage source 12 is formed by a modular energy storage direct converter having a converter arm that comprises a plurality of sequentially interconnected standard modules 14. Various embodiments of possible standard modules 14 are summarized in FIG. 13a to FIG. 13d. FIG. 13a shows a module 14 with full bridge topology that was previously described. It has one first terminal 16, one second terminal 18, a battery 20 and four module switches 22. By operating the module switches 22, the batteries 20 of adjacent standard modules can be connected in series and in anti-series. Moreover, every battery 20 can be selectively deactivated or "bypassed".

Figure 13B:
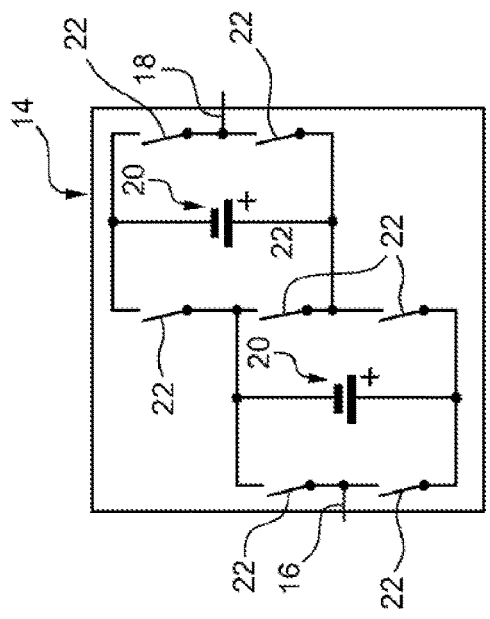

FIG. 13b shows a further standard module 14 comprising two batteries 20 within the standard module 14, the batteries 20 can be selectively switched in series or in parallel. However, batteries from different standard modules 14 cannot be switched in parallel. Note that the module shown in FIG. 13b is comprised of two "quasi-full bridge" modules, but in preferred embodiments, a higher number of such "quasi-full bridge" modules may be integrated in one standard module 14.

Figure 13D:
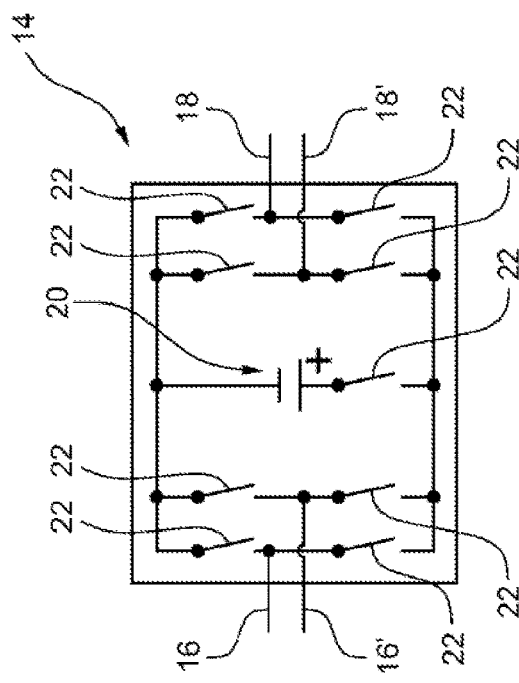
Figure 13A:
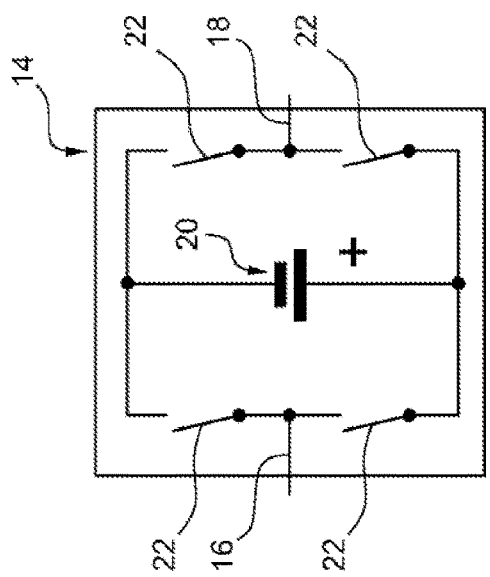
Figure 13C:
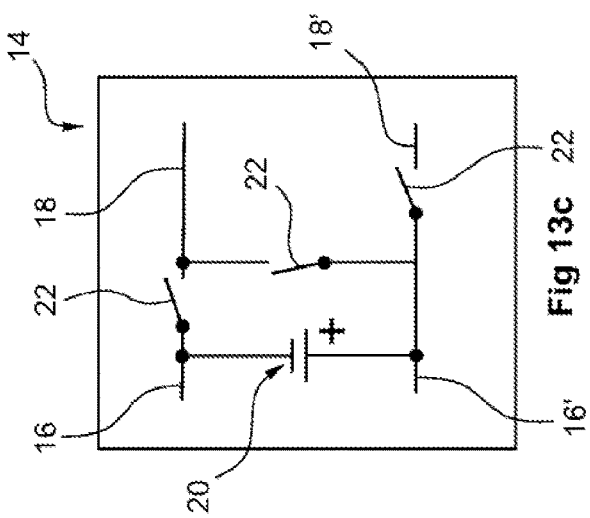

FIG. 13c shows a particularly advantageous standard module 14, that was also employed in FIGS. 2 and 3. This standard module has two first terminals 16, 16' and two second terminals 18, 18'. Although it comprises only three module switches 22, it allows for selectively connecting batteries of adjacent modules 14 either in parallel or in series. Contrary to the other standard modules 14 shown herein, it does not, however, allow for generating negative voltages.

Finally, FIG. 13d shows a standard module 14 providing for the highest degree of flexibility. The standard module of FIG. 30d has likewise two first terminals terminal 16, 16' and two second terminals 18, 18' and a total of seven module switches 22. The module switches 22 allow for connecting batteries 20 of adjacent standard modules selectively in series, in anti-series and in parallel. Moreover, they allow for connecting batteries 20 of standard modules 14 which are separated by at least one intermediate standard module with a deactivated battery selectively in parallel and in series.

FIG. 14 schematically illustrates the operation principle of the modular energy storage direct converter as a preferred embodiment of the variable voltage source 12 for use in the system of the invention. On top of FIG. 14, a converter arm of a modular energy storage direct converter is shown, which in this case is comprised of only three standard modules 14. The leftmost waveform shows a sinusoidal output voltage of the converter arm under full load. The sinusoidal output voltage is obtained by selectively switching the switches 22 of the standard modules 14 such as to connect an appropriate number of batteries 20 in series to thereby match the desired output voltage as closely as possible. Since there is a finite number of modules, the output voltage is generally a stepped function. Depending on the number of modules (which could be hundreds or more than a thousand in the same converter arm), such stepped output could simply be accepted. In the alternative, the stepped output can be smoothed by an additional PWM modulation as is indicated in FIG. 14.

In the illustrative example of FIG. 14, under full load, close to the maximum of the output voltage, all three batteries 20 are connected in series (for positive output voltages) or in anti-series (for negative output voltages). For intermediate output voltages, it is sufficient if two batteries 20 are connected in series or anti-series, so that it would in principle be possible to deactivate one of the batteries 20. However, as is indicated in FIG. 14, instead of deactivating batteries 20 that are not needed in the series connection, these batteries are connected in parallel, to thereby reduce the internal resistance of the converter arm as a whole. The same is true for even lower output voltages, where in fact all three batteries 20 are connected in parallel.

With the standard module 14 shown in FIG. 14 and FIG. 13d, it is possible to connect batteries of modules in parallel that are separated by any number of intermediate modules 14 with deactivated battery 20. Accordingly, there is a large degree of freedom as to which batteries 20 are to be connected in parallel. This is important, because one wishes to connect only those batteries 20 in parallel which have equal voltages or voltages that differ only minimally, in order to avoid balancing currents between these batteries, which would lead to unwanted losses. The control unit 32 (not shown in FIG. 14) can monitor the voltages of each individual battery 20 and can ensure that the voltages of the batteries 20 are balanced by the way they are employed in the generation of the output voltage. For example, batteries 20 with a higher charging state and hence higher voltage would be preferably used in the series connection in an energy outputting mode. Conversely, in the charging mode, batteries with a lower charging state and hence low voltage would be preferably connected to an outside charging voltage, while batteries 20 with a higher charging state would at first be decoupled. Only when two batteries reach the same voltage, they will be connected in parallel. For this switching strategy, it is important that batteries 20 of modules 14 which are not directly adjacent, but are separated by one or more modules with deactivated battery, can nevertheless be switched in parallel, which is made possible by the module 14 as shown in FIG. 14 and FIG. 13d.

The waveforms in the two diagrams to the right of FIG. 14 show the output voltage at only partial load. Under partial load, a larger fraction of batteries 20 can be switched in parallel, thereby reducing the internal resistance of the converter arm and increasing the energy efficiency.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications should be protected that presently or in the future lie within the scope of protection of the invention as defined in the claims.

What is claimed is:

1. A system for supplying AC driving voltages to a plurality of electric motors, wherein said plurality of electric motors comprise a main electric motor and one or more additional electric motors, said system comprising:
    a control unit for generating or receiving a time-dependent set value of a phase voltage to be applied to each phase of each electric motor of said plurality of electric motors,
    a variable voltage source associated with each phase of said main motor, wherein each of said variable voltage sources is configured to provide a variable voltage under the control of said control unit,
    wherein each phase of said main electric motor is connected or connectable to a corresponding one of the variable voltage sources,
    wherein with each phase of each of said one or more additional electric motors a plurality of switches is associated, which are controllable by said control unit, said plurality of switches allowing, under control of said control unit, for selectively acquiring
        a neutral switching state, in which the phase of said additional electric motor is not receiving energy from said variable voltage source,
    and at least one of
        a positive parallel switching state, in which the phase of the additional electric motor is connected in parallel with the variable voltage source, and
        a positive serial switching state, in which the phase of the additional electric motor is connected in series with the corresponding phase of the main electric motor,
    wherein said control unit is configured to control switching of the plurality of switches associated with a given phase of a given additional electric motor between switching states including said neutral switching state and at least one of said positive parallel and positive serial switching states, to thereby apply an effective voltage to said given phase corresponding to the set value of the corresponding phase voltage,
    and wherein said control unit is configured to control each of said variable voltage sources to provide a voltage corresponding to or at least close to a voltage ensuring that an effective voltage corresponding the set value of the corresponding phase voltage of the main electric motor is applied to each of its phases, in consideration of the effective voltages applied to the phases of the additional electric motors by switching said plurality of switches associated with these phases.

2. The system of claim 1, wherein said plurality of switches associated with each phase of each of said additional electric motors further allow for acquiring, under the control of the control unit, at least one of
    a negative parallel switching state, in which the phase of the additional electric motor is connected anti-parallel with the variable voltage source and
    a negative serial switching state, in which the phase of the additional electric motor is connected in anti-series with the corresponding phase of the main electric motor.

3. The system of claim 1, wherein the control unit is configured to control said plurality of switches associated with a given phase of a given additional electrical motor to selectively establish a switching state selected from said neutral switching state, said positive parallel switching state and preferably also said negative parallel switching state, to thereby apply an effective voltage to said given phase corresponding to the set value of the corresponding phase voltage,
    and wherein said control unit is configured to control each of said variable voltage sources to provide a voltage corresponding to or at least close to the set value of the corresponding phase voltage of the main electric motor plus a common offset voltage that is common to each of said variable voltage sources.

4. The system of claim 3, wherein said common offset voltage is dynamically determined, based on the set values of the phase voltages to be applied to each phase of each electric motor of said plurality of electric motors, and in particular such that the absolute value of said common offset voltage is as small as possible while still allowing voltages according to the set values of the phase voltages of each of the additional electric motors to be applied at each instance in time.

5. The system of claim 1, wherein the control unit is configured to control said plurality of switches associated with a given phase of a given additional electrical motor to selectively establish a switching state selected from at least said neutral switching state, and said positive serial switching state and preferably also said negative serial switching state, to thereby apply an effective voltage to said given phase corresponding to the set value of the corresponding phase voltage, and wherein said control unit is configured to control each of said variable voltage sources to provide a voltage corresponding to or at least close to the sum of the absolute values of the set values of the corresponding phase voltages of the plurality of electric motors.

6. The system of claim 1, wherein said main electric motor is designed for higher power than the additional electric motors.

7. The system of claim 1, wherein the main electric motor has a single phase terminal per phase, and wherein applying a phase voltage to said phase comprises applying said phase voltage between said single phase terminal and a star point at which windings corresponding to the individual phases are connected.

8. The system of claim 1, wherein the one or more additional electric motors have two phase terminals per phase, and wherein applying a phase voltage to said phase comprises applying said phase voltage between the two phase terminals.

9. The system of claim 8, wherein said plurality of switches associated with a given phase of a given additional electric motor are arranged in a bridge circuit topology having two branches including two switches each, wherein one of said two phase terminals is connected with an intermediate point between the switches in one branch, and the other of said two phase terminals is connected with an intermediate point between switches in the other branch.

10. The system of claim 1, wherein said control unit is configured to control switching of the plurality of switches associated with a given phase of a given additional electric motor according to one of a PWM modulation, a Delta modulation, or and a Delta-Sigma modulation.

11. The system of claim 1, wherein the number of phases of each of said plurality of electric motors is 3, and wherein the 3 time-dependent set values for the phase voltages of each of said plurality of electric motors follow sinusoidal functions with same amplitude and frequency and with a phase shift of 120°.

12. The system of claim 1, wherein the time-dependent set values of the phase voltages to be applied to the phases of each electric motor of said plurality of electric motors follow a periodic, in particular sinusoidal function characterized by a frequency, an amplitude and a phase offset, and wherein the time-dependent set values of corresponding phase voltages of the main electric motor and at least one of the additional electric motors differ with regard to at least one of said frequency, amplitude, and phase offset.

13. The system of claim 1, wherein said control unit is configured to determine or receive information regarding the time dependent impedances of each phase of each of said plurality of electric motors, and to determine said time-dependent set values of said phase voltages to be applied to each phase of each electric motor of said plurality of electric motors based thereon.

14. The system of claim 1, wherein the electric motors are traction motors of an electric vehicle.

15. The system of claim 1, wherein each of said variable voltage sources is formed by a modular energy storage direct converter system comprising a converter arm comprising a plurality of sequentially interconnected standard modules, wherein each standard module comprises at least one first terminal and at least one second terminal,
a storage element for electrical energy, in particular a battery, or an energy conversion element, and
a plurality of module switches,
wherein in each two adjacent standard modules the at least one first terminal of one standard module is connected either directly or via an intermediate component to the at least one second terminal of the other standard module,
wherein said plurality of module switches of the standard modules allow at least for selectively deactivating the storage element or energy conversion clement of each standard module and for connecting storage elements or energy conversion elements of adjacent standard modules in series,
wherein said control unit is configured to receive information regarding the current charge state of the storage elements or voltage or output power of the energy conversion elements, and is configured for actuating at least a part of said plurality of module switches depending on the current charge state of the storage elements or the current output power of voltage of the energy conversion elements such that the converter arm as a whole supplies said variable voltage.

16. The system of claim 15, wherein said plurality of module switches of the standard modules further allow for selectively connecting storage elements or energy conversion elements of adjacent standard modules in anti-series.

17. The system of claim 15, wherein at least the standard modules which are not the first and last in the sequential interconnection each comprise at least two first terminals and at least two second terminals, wherein in each two adjacent standard modules the at least two first terminals of one standard module are connected either directly or via an intermediate component to a corresponding one of the at least two second terminals of the other standard module, and wherein said plurality of module switches of the standard modules further allow for selectively connecting storage elements or energy conversion elements of adjacent standard modules in parallel.

18. The system of claim 15, wherein the system comprises a plurality of variable voltage sources formed by converter arms which are connected in a ring topology or a star topology.

19. The system of claim 14, wherein the number of additional electric motors is 1 or 3.

20. The system of claim 19, wherein the number of additional electric motors is 3, and wherein the main electric motor and the 3 additional electric motors are each associated with a corresponding one of four wheels of said electric vehicle.

21. The system of claim 17, wherein said plurality of module switches of the standard modules further allow for connecting storage elements or energy conversion elements of standard modules which are separated by at least one intermediate standard module with a deactivated storage element/conversion element selectively in parallel and in series.

22. A method for supplying AC driving voltages to a plurality of electric motors, wherein said plurality of electric motors comprise a main electric motor and one or more additional electric motors, wherein each phase of said main electric motor is connected or connectable to a corresponding variable voltage source, and wherein with each phase of each of said one or more additional electric motors a plurality of switches is associated, allowing for selectively acquiring a neutral switching state, in which the phase of said additional electric motor is not receiving energy from said variable voltage source, and at least one of
- a positive parallel switching state, in which the phase of the additional electric motor is connected in parallel with the variable voltage source, and
- a positive serial switching state, in which the phase of the additional electric motor is connected in series with the corresponding phase of the main electric motor, wherein the method comprises the steps of:

generating or receiving a time-dependent set value of a phase voltage to be applied to each phase of each electric motor of said plurality of electric motors, switching of the plurality of switches associated with a given phase of a given additional electric motor between switching states including said neutral switching state and at least one of said positive parallel and positive serial switching states, to thereby apply an effective voltage to said given phase corresponding to the set value of the corresponding phase voltage, and controlling each of said variable voltage sources to provide a voltage corresponding to or at least close to a voltage ensuring that an effective voltage corresponding the set value of the corresponding phase voltage of the main electric motor is applied to each of its phases, in consideration of the effective voltages applied to the phases of the additional electric motors by switching said plurality of switches associated with these phases.

23. The method of claim 22 wherein said plurality of switches associated with each phase of each of said additional electric motors further allow for acquiring at least one of
- a negative parallel switching state, in which the phase of the additional electric motor is connected anti-parallel with the variable voltage source and
- a negative serial switching state, in which the phase of the additional electric motor is connected in anti-series with the corresponding phase of the main electric motor.

24. The method of claim 22, further comprising a step of controlling said plurality of switches associated with a given phase of a given additional electrical motor to selectively establish a switching state selected from said neutral switching state, said positive parallel switching state and preferably also said negative parallel switching state, to thereby apply an effective voltage to said given phase corresponding to the set value of the corresponding phase voltage, and controlling each of said variable voltage sources to provide a voltage corresponding to or at least close to the set value of the corresponding phase voltage of the main electric motor plus a common offset voltage that is common to each of said variable voltage sources.

25. The method of claim 24, further comprising a step of dynamically determining said common offset voltage, based on the set values of the phase voltages to be applied to each phase of each electric motor of said plurality of electric motors.

26. The method of claim 22, further comprising a step of controlling said plurality of switches associated with a given phase of a given additional electrical motor to selectively establish a switching state selected from said neutral switching state, said positive serial switching state and preferably also said negative serial switching state, to thereby apply an effective voltage to said given phase corresponding to the set value of the corresponding phase voltage, and of controlling each of said variable voltage sources to provide a voltage corresponding to or at least close to the sum of the absolute values of the set values of the corresponding phase voltages of the plurality of electric motors.

27. The method of claim 22, wherein each of said variable voltage sources is formed by a modular energy storage direct converter system comprising a converter arm comprising a plurality of sequentially interconnected standard modules, wherein each standard module comprises
- at least one first terminal and at least one second terminal,
- a storage element for electrical energy, in particular a battery, or an energy conversion element, and
- a plurality of module switches, wherein in each two adjacent standard modules the at least one first terminal of one standard module is connected either directly or via an intermediate component to the at least one second terminal of the other standard module, wherein said plurality of module switches of the standard modules allow at least for selectively deactivating the storage element or energy conversion element of each standard module and for connecting storage elements or energy conversion elements of adjacent standard modules in series, wherein said method further comprises a step of receiving information regarding the current charge state of the storage elements or voltage or output power of the energy conversion elements, and of actuating at least a part of said plurality of module switches depending on the current charge state of the storage elements or the current output power of voltage of the energy conversion elements such that the converter arm as a whole supplies said variable voltage.

* * * * *